United States Patent
Desinor, Jr.

(10) Patent No.: US 10,403,069 B2
(45) Date of Patent: Sep. 3, 2019

(54) REAL ESTATE WIRELESS LOCKBOX

(71) Applicant: Garcia Desinor, Jr., Dallas, TX (US)

(72) Inventor: Garcia Desinor, Jr., Dallas, TX (US)

(*) Notice: Subject to any disclaimer, the term of this patent is extended or adjusted under 35 U.S.C. 154(b) by 7 days.

(21) Appl. No.: 15/898,841

(22) Filed: Feb. 19, 2018

(65) Prior Publication Data

US 2018/0190056 A1   Jul. 5, 2018

Related U.S. Application Data

(63) Continuation-in-part of application No. 15/630,293, filed on Jun. 22, 2017, now Pat. No. 10,249,121, which is a continuation of application No. 14/937,533, filed on Nov. 10, 2015, now Pat. No. 9,704,319.

(60) Provisional application No. 62/096,216, filed on Dec. 23, 2014.

(51) Int. Cl.
*G07C 9/00* (2006.01)
*E05B 19/00* (2006.01)
*G06Q 50/16* (2012.01)
*E05B 47/00* (2006.01)

(52) U.S. Cl.
CPC ...... *G07C 9/00309* (2013.01); *E05B 19/0005* (2013.01); *G07C 9/00896* (2013.01); *E05B 2047/0095* (2013.01); *G06Q 50/16* (2013.01); *G07C 9/00571* (2013.01); *G07C 2009/00325* (2013.01); *G07C 2009/00769* (2013.01); *G07C 2009/00793* (2013.01); *G07C 2009/00865* (2013.01); *G07C 2009/00936* (2013.01); *G07C 2209/08* (2013.01)

(58) Field of Classification Search
None
See application file for complete search history.

(56) References Cited

U.S. PATENT DOCUMENTS

| | | | |
|---|---|---|---|
| 4,594,637 A | 6/1986 | Falk | |
| 4,609,780 A | 9/1986 | Clark | |
| 4,628,636 A * | 12/1986 | Folger | E05F 15/41 49/199 |
| 4,777,556 A | 10/1988 | Imran | |
| 4,800,255 A | 1/1989 | Imran | |
| 4,851,652 A | 7/1989 | Imran | |
| 4,864,115 A | 9/1989 | Imran | |
| 4,988,987 A | 1/1991 | Barrett | |
| 5,557,888 A | 9/1996 | Ruchat et al. | |
| 6,472,973 B1 | 10/2002 | Harold et al. | |
| 6,581,332 B1 | 6/2003 | Kim | |
| 8,164,419 B2 * | 4/2012 | Fisher | E05B 19/0005 340/5.73 |
| 8,373,555 B1 | 2/2013 | Redden et al. | |

(Continued)

FOREIGN PATENT DOCUMENTS

| | | |
|---|---|---|
| CA | 1222038 | 5/1987 |
| CA | 1274894 | 10/1990 |

(Continued)

*Primary Examiner* — Laura N Nguyen
(74) *Attorney, Agent, or Firm* — Frost Brown Todd LLC

(57) ABSTRACT

A system and method are described regarding a wireless lockbox and smart key that can be used to manage real estate tours. The key can detect its location and report its location to a remote device. If the key is moved outside a predetermined boundary set by an owner, then the key can send an alert to the remote device.

20 Claims, 26 Drawing Sheets

(56) References Cited

U.S. PATENT DOCUMENTS

| | | |
|---|---|---|
| 9,704,319 B2 | 7/2017 | Desinor, Jr. |
| 2007/0018787 A1 | 1/2007 | Martinez de Velasco Cortina et al. |
| 2007/0090921 A1 | 4/2007 | Fisher |
| 2008/0103787 A1 | 5/2008 | Cavanaugh |
| 2008/0252415 A1 | 10/2008 | Larson et al. |
| 2009/0153291 A1 | 6/2009 | Larson et al. |
| 2009/0167488 A1 | 7/2009 | Hays et al. |
| 2009/0167526 A1 | 7/2009 | Graves et al. |
| 2009/0251280 A1* | 10/2009 | Marchetto ............... G08C 17/02 340/5.7 |
| 2011/0053557 A1* | 3/2011 | Despain ................ A47G 29/10 455/410 |
| 2012/0068817 A1 | 3/2012 | Fisher |
| 2012/0126936 A1 | 5/2012 | Harkins et al. |
| 2012/0297684 A1 | 11/2012 | Bresson et al. |
| 2012/0326845 A1* | 12/2012 | McGinn ................ G06Q 30/02 340/10.1 |
| 2013/0009785 A1 | 1/2013 | Finn et al. |
| 2015/0022315 A1 | 1/2015 | Ng |
| 2015/0091696 A1* | 4/2015 | Fisher ................ G07C 9/00571 340/5.61 |
| 2015/0360027 A1 | 12/2015 | Bachinski et al. |
| 2016/0094773 A1 | 3/2016 | Maciuca |
| 2016/0267730 A1* | 9/2016 | Wadhwani ............... B60L 53/65 |
| 2017/0294064 A1 | 10/2017 | Desinor, Jr. |

FOREIGN PATENT DOCUMENTS

| | | |
|---|---|---|
| EP | 1981003 A2 | 10/2008 |
| WO | WO 2004/077848 A2 | 9/2004 |
| WO | WO 2009/064689 A1 | 5/2009 |

\* cited by examiner

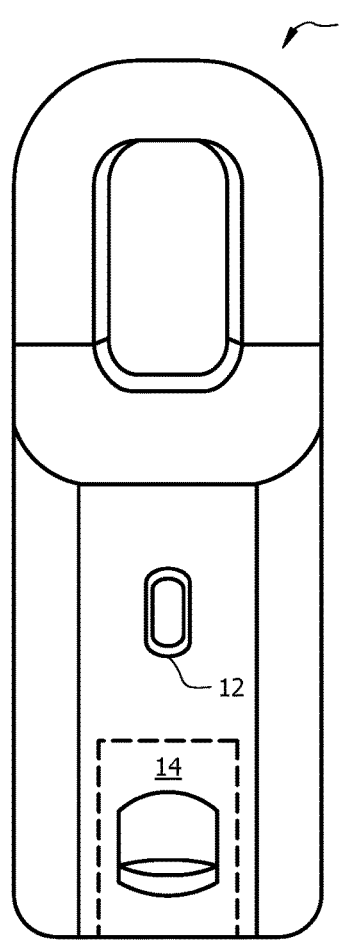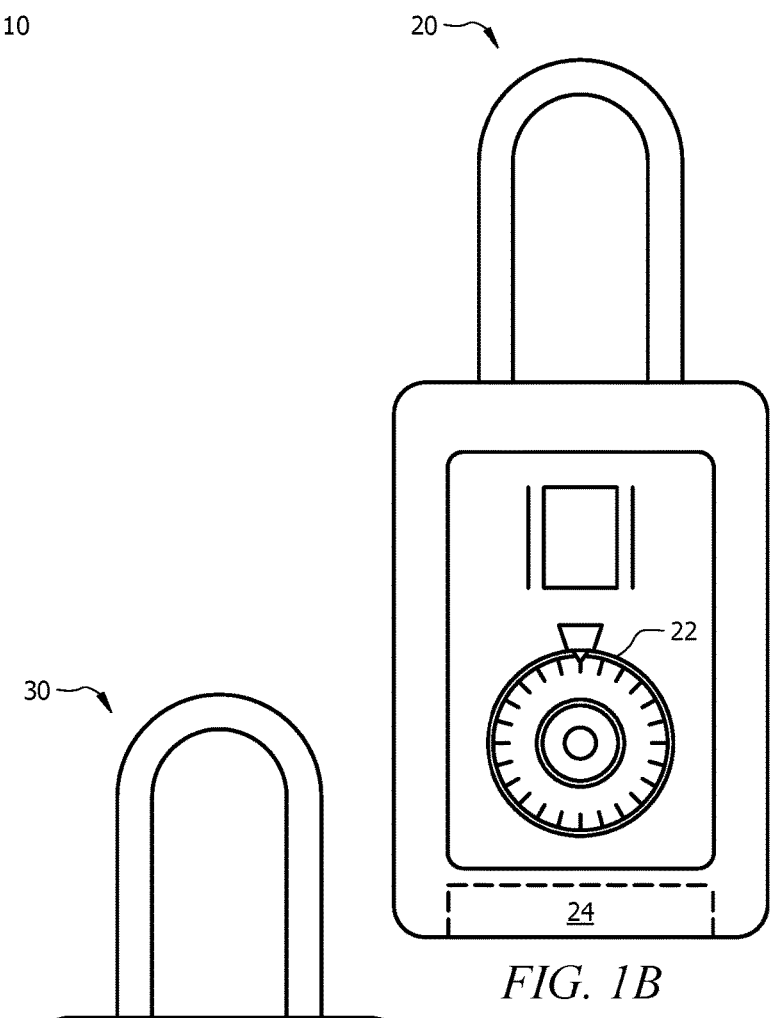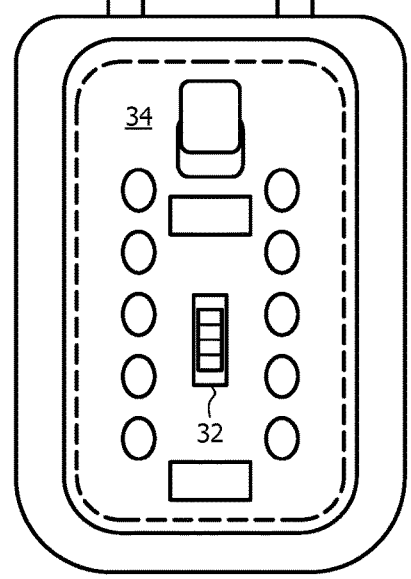
FIG. 1A
(Prior Art)
FIG. 1B
(Prior Art)
FIG. 1C
(Prior Art)

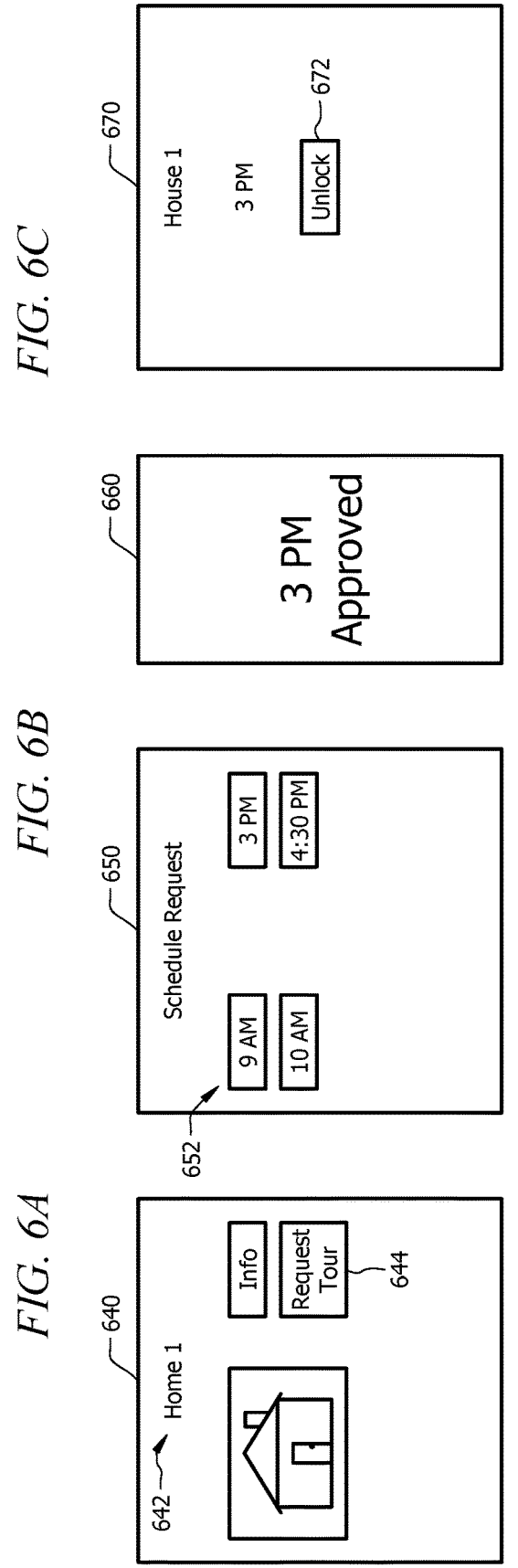

Name: _____ ← 712
Information: _____
Address: _____

Upload Pictures

[4 image boxes] ← 722

House Information

Size: _____
Bedroom: _____
Bath: _____ ← 732

Tour Availability

Request
Time: 3:00 PM
User: Adam Smith ← 756
_____
[Approve] ← 752   [Reject] ← 754

REAL ESTATE WIRELESS LOCKBOX

CROSS REFERENCE TO RELATED INFORMATION

This application is a continuation-in-part of U.S. application Ser. No. 15/630,293, filed Jun. 22, 2017; which is a continuation of U.S. application Ser. No. 14/937,533, filed Nov. 10, 2015, now U.S. Pat. No. 9,704,319 B2; which claims the benefit of U.S. Provisional Patent Application No. 62/096,216, filed Dec. 23, 2014; the contents of all of which are hereby incorporated herein in their entirety.

TECHNICAL FIELD

The present disclosure is directed to lockboxes for use in real estate sales and by realtors and more particularly to a remotely controllable lockbox.

BACKGROUND OF THE INVENTION

The real estate market is largely dependent on realtors. Realtors offer great services but sometimes buyers or sellers would like to have more flexibility in how they approach the market. For example, if a couple is shopping for a new home they will often contact a realtor. The realtor looks for available homes in the couple's desired location and price range and sets appointments for viewings. The realtor brings great knowledge to the process regarding locations, costs, and other market factors. But the process of setting appointments, and wrestling with the schedules of the people involved can be difficult and time consuming. It would be great to have a tool that could interface buyers and sellers directly, allowing greater flexibility and efficiency in setting appointments and viewings.

Along with creating efficiencies in setting viewings, it would be great to have a tool that interfaces buyers and sellers with regard to real estate listings. It can be difficult for a seller to know how to list his home for sale, how to publish, etc., and buyers may not know where to go to see what homes are for sale. Both sides end up going to realtors and letting them do the listing and/or searching.

The real estate market currently uses lockboxes placed on a door knob or porch of a listed house. These lockboxes contain a key to the house. Often times a code or other unlocking mechanism for the lockbox is known only to licensed realtors. These lockboxes allow a realtor to access and show a house when the owner is unavailable. While current lockboxes have their uses, they lack many capabilities that would be beneficial in today's world of connected and smart devices.

BRIEF SUMMARY OF THE INVENTION

One embodiment under the present disclosure comprises a wireless lockbox system for storing a key at a property. The system comprises a wireless lockbox and a key. The wireless lockbox can comprise a first Bluetooth interface, a tray, a microprocessor operable to deploy and retract the tray by controlling a motor, and a power supply. The wireless lockbox can be configured to pair with a mobile device via the first Bluetooth interface and to communicate with a remote device via a data interface of the mobile device. The wireless lockbox can be further configured to receive information from the remote device for determining if the mobile device is allowed to command the microprocessor to deploy and retract the tray. The key can be configured to fit within the tray and can comprise a second Bluetooth interface. The key can be configured to pair with the mobile device via the second Bluetooth interface and to collect data about they key's movement. The key can be further configured to transmit the data to the remote device via the data interface.

Another embodiment under the present disclosure can comprise a smart key. The smart key can comprise a body portion configured to unlock a door, a power supply, a microprocessor, and a Bluetooth interface configured to couple with a wireless lockbox and with a mobile device. The smart key can be configured to collect data about its location and to transmit the data to one or more remote devices over the Bluetooth interface.

Another embodiment under the present disclosure can comprise a method of detecting the location of a house key. The method can comprise receiving a notification that a wireless lockbox has been powered on, wherein the notification is received from the wireless lockbox via a data connection of a mobile device that the wireless lockbox is paired with via Bluetooth. Then an indication can be sent that a user of the mobile device is approved to access a key inside the wireless lockbox, the key comprising a Bluetooth interface configured to pair with the mobile device and to send information via the data connection and the key configured to collect data about its location. Then data can be received from the key about the location of the key via the data connection of the mobile device.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying Figures. It is to be expressly understood, however, that each of the Figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIGS. 1A-1C are diagrams of prior art embodiments of lockboxes;

FIGS. 6A-6G are diagrams of user interface embodiments under the present disclosure;

FIGS. 7A-7E are diagrams of user interface embodiments under the present disclosure;

FIGS. 8A-8E are diagrams of user interface embodiments under the present disclosure;

FIGS. 9A-9C are diagrams of user interface embodiments under the present disclosure;

DETAILED DESCRIPTION OF THE INVENTION

Figure 2:
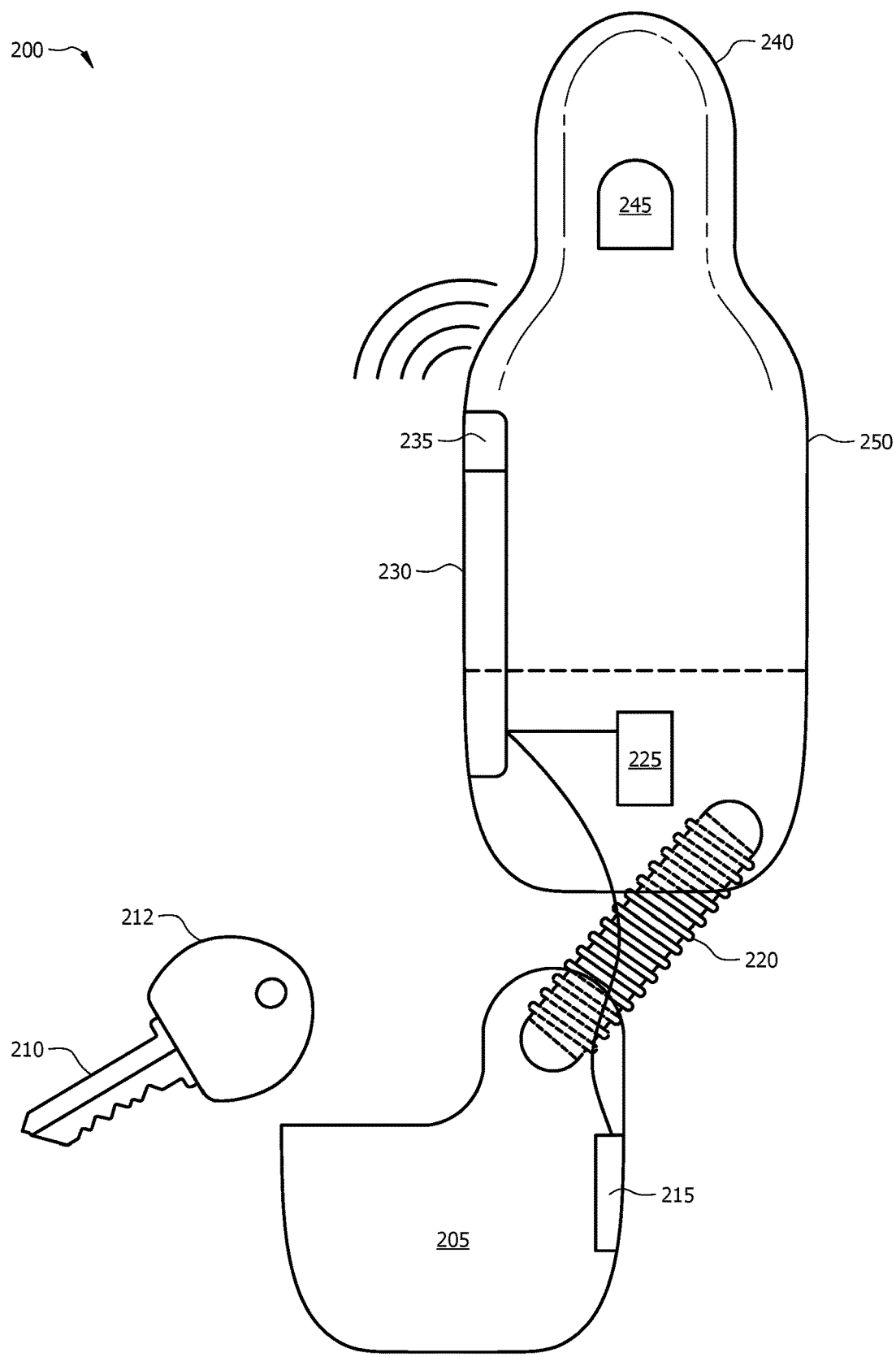
FIG. 2 is a diagram of an embodiment of the present disclosure.

The present disclosure describes a wirelessly connected real estate lockbox. Such a wireless lockbox can be of great value in the real estate market and for use by home owners and realtors. The wireless lockbox can be placed at the door of a house or apartment being sold. A buyer or realtor, desiring to tour the house or apartment, may unlock the wireless lockbox via a wireless signal such as Bluetooth. The property owner may also control the wireless lockbox remotely via a wireless signal such as cellular. The various users may all interact with the wireless lockbox via an application on a mobile device such as a smartphone or tablet. The system and method described herein allow property owners greater control over the sale of their property. The teachings disclosed herein allow an owner to set schedules, lock, unlock and perform other lockbox operations from a remote location. Embodiments and systems described herein can help sellers and buyers find each other, schedule visits, communicate, negotiate sales, and more. Realtors may be acting on behalf of either sellers or buyers, and may have seller or buyer accounts that allow them to act on behalf of other users.

FIGS. 1A-1C display several prior art lockboxes. Lockbox 10 features an infrared sensor 12. When the sensor 12 receives a proper unlock signal the lockbox unlocks partition 14 that contains a key. Lockbox 20 features a combination lock 22 that can release partition 24. Lockbox 30 features keys 32 that, when a proper code is entered, unlocks partition 34 and a key inside.

Figure 3:
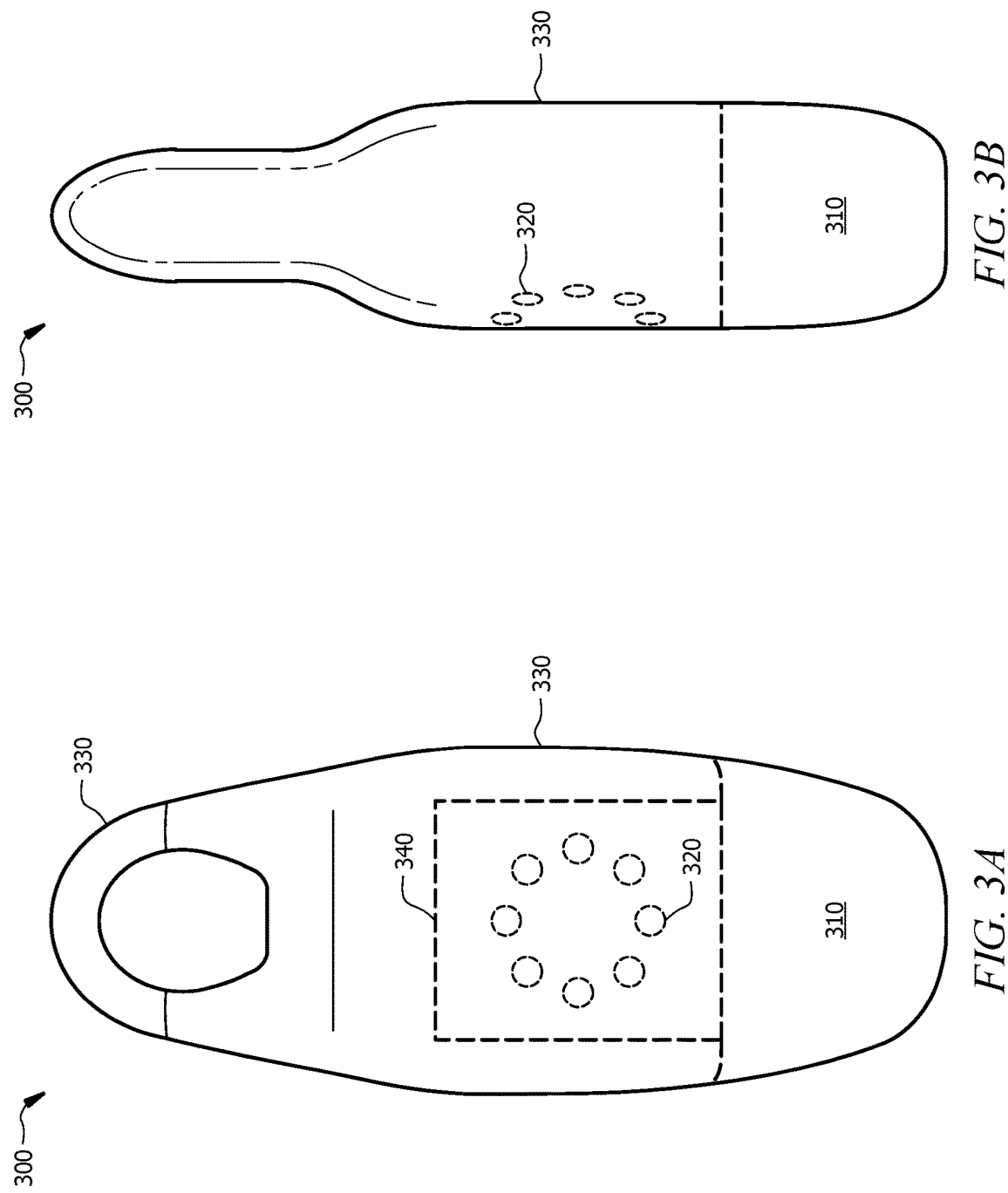
FIGS. 3A-3B are diagrams of a front and side view of an embodiment of the present disclosure.

FIG. 2 displays an embodiment of a wireless lockbox under the present disclosure. Wireless lockbox 200 features main body 250 and tray 205. Circuit board 230 comprises a microprocessor that controls wireless lockbox 200. In this embodiment, tray 205 is deployed from main body 250 by means of a rotating screw 220 that is being turned in clockwise and counterclockwise directions by a motor 225 (other embodiments can comprise different deployment mechanisms). The microprocessor (not shown) or other mechanism or software on the circuit board can turn the screw 220 counterclockwise to deploy or open the tray, and clockwise to retract or close the tray (or vice versa). Other means than a screw are possible, such as: pneumatic actuation, a linear actuator, spring loaded with a retractable connection, and others. In a preferred embodiment the tray 205 can be deployed and retracted by the microprocessor (or circuit board, hardware, software, or other chip) such that a human does not need to pull the tray out to open or push it in to close it (without human interaction beyond a command to e.g. the microprocessor). Sensor 215 can detect when key 210 (comprising an electronic chip 212) is located within the tray 205. In a preferred embodiment sensor 215 comprises an RFID sensor. Circuit board 230 comprises connections to sensor 215 and motor 225. The circuit board also comprises a wireless interface 235. In a preferred embodiment, the wireless lockbox 200 can comprise both a Bluetooth interface and a cellular interface. Solenoid latch 245 can unlock the arm 240. Arm 240 can allow the wireless lockbox 200 to be placed on a door knob or locked to another location on a house. FIGS. 3A and 3B show views of the wireless lockbox 200 of FIG. 2. Wireless lockboxes 300 are in a closed position. Tray 310 can house a key. LED lights 320 can be used to indicate power, locking, unlocking or other actions. Circuit board 340 can comprise the microprocessor, wireless interfaces, power supply and other features of the wireless lockbox. Arm 330 can allow the wireless lockbox 300 to attach to a door knob.

FIG. 2 shows an embodiment of the security key 210 of the invention. Key 210 comprises a serrated portion and an electronic chip or transmitter portion 212. Chip 212 can be integrated into key 210 or be an add-on. Chip 212 can comprise a wireless transmitter and/or receiver allowing the wireless lockbox 200 to determine the proximity of key 210. When key 210 moves beyond a chosen distance from wireless lockbox 200, such as 100 yards, an alarm or notification can be sent to the owner. The chip 212 can utilize Bluetooth, RFID, Wi-Fi or another wireless technology.

Figure 4:
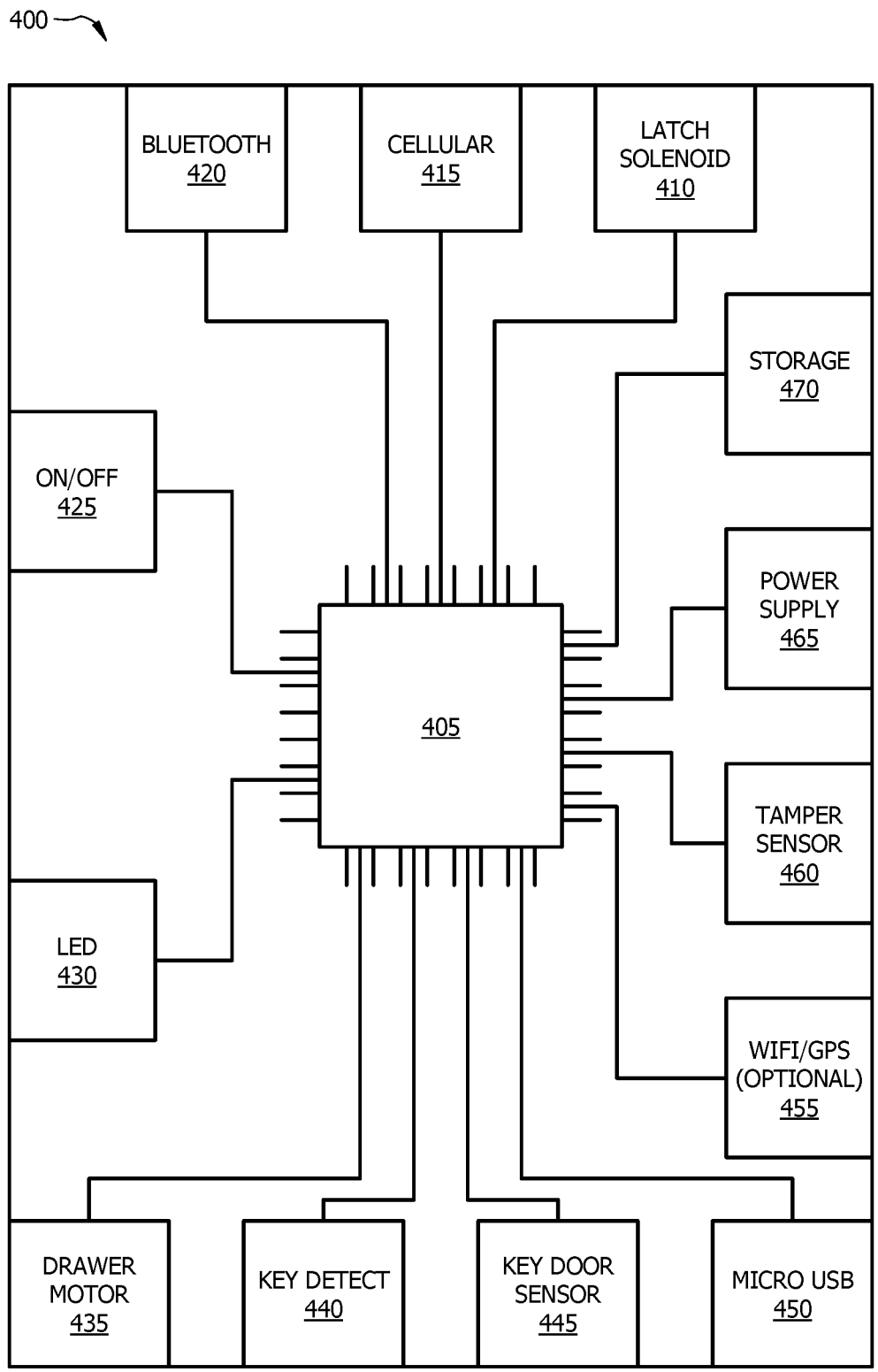
FIG. 4 is a diagram of a circuit board embodiment under the present disclosure.

FIG. 4 displays an embodiment of a circuit board such as board 230 of FIG. 2 or board 340 of FIG. 3A. Board 400 comprises a microprocessor 405. Processor 405 can comprise connections to various hardware and/or software components, such as those displayed. Latch solenoid 410 opens and locks the arm for attachment to a door knob. A preferred embodiment comprises a solenoid latch, but other embodiments can comprise different locking or attaching mechanisms. Some embodiments may not comprise an arm. Cellular interface 415 provides a connection to a cellular network. Interface 415 may comprise any necessary software, antennas or other hardware/software necessary for communicating over a cellular communication network. The network may be 3G, 4G, WiMAX, or any appropriate network protocol. Bluetooth interface 420 provides a connection via Bluetooth. Interface 420 can comprise any necessary software, antenna or hardware necessary to communicate via Bluetooth. On/off switch 425 allows users to power on and off the wireless lockbox. LEDs 430 comprise a group of LED lights, in a preferred embodiment, on the front of the wireless lockbox. Other embodiments may eschew LED lights for different types of lights or screens to notify the user of various settings or allow interaction with the user. Drawer motor 435 can comprise a motor or actuator that opens the drawer/tray where the key can be stored. Various embodiments can comprise a magnetic attachment, solenoid latch, or other electrical, mechanical, or magnetic connection between the drawer/tray and the main body of the wireless lockbox. Key detect 440 comprises, in a preferred embodiment, an RFID sensor that can detect an RFID chip on the key. Other embodiments can comprise different methods and systems for detecting the key. Magnetic, electric, or other types of sensors may be used. Key door sensor 445 detects when the drawer is closed so as to stop the motor 435. Micro USB 450 provides a means for charging the wireless lockbox and/or updating software. Other embodiments can comprise a different type of charging or computer interface. For example, USB may be used or other connections well known in the telecommunications and consumer electronics markets. Tamper sensor 460 can comprise a sensor to detect when the wireless lockbox is being tampered with. Tamper sensor 460 can comprise a temperature sensor, pressure sensor, accelerometer or other type of tamper sensor. Power supply 465 provides a power supply to the wireless lockbox. Power supply 465 can comprise various types of batteries such as lithium-ion, solar panel, rechargeable, rechargeable lithium-ion, or other types or combinations of power supply. Storage 470 provides storage space and/or memory for use by the microprocessor. Storage 470 can store operating instructions, data and other needed information. Circuit board can comprise optional Wi-Fi or GPS interfaces 455. A Wi-Fi interface can provide a connection to a local wireless internet network. A GPS can provide reception to a GPS satellite.

Figure 5:
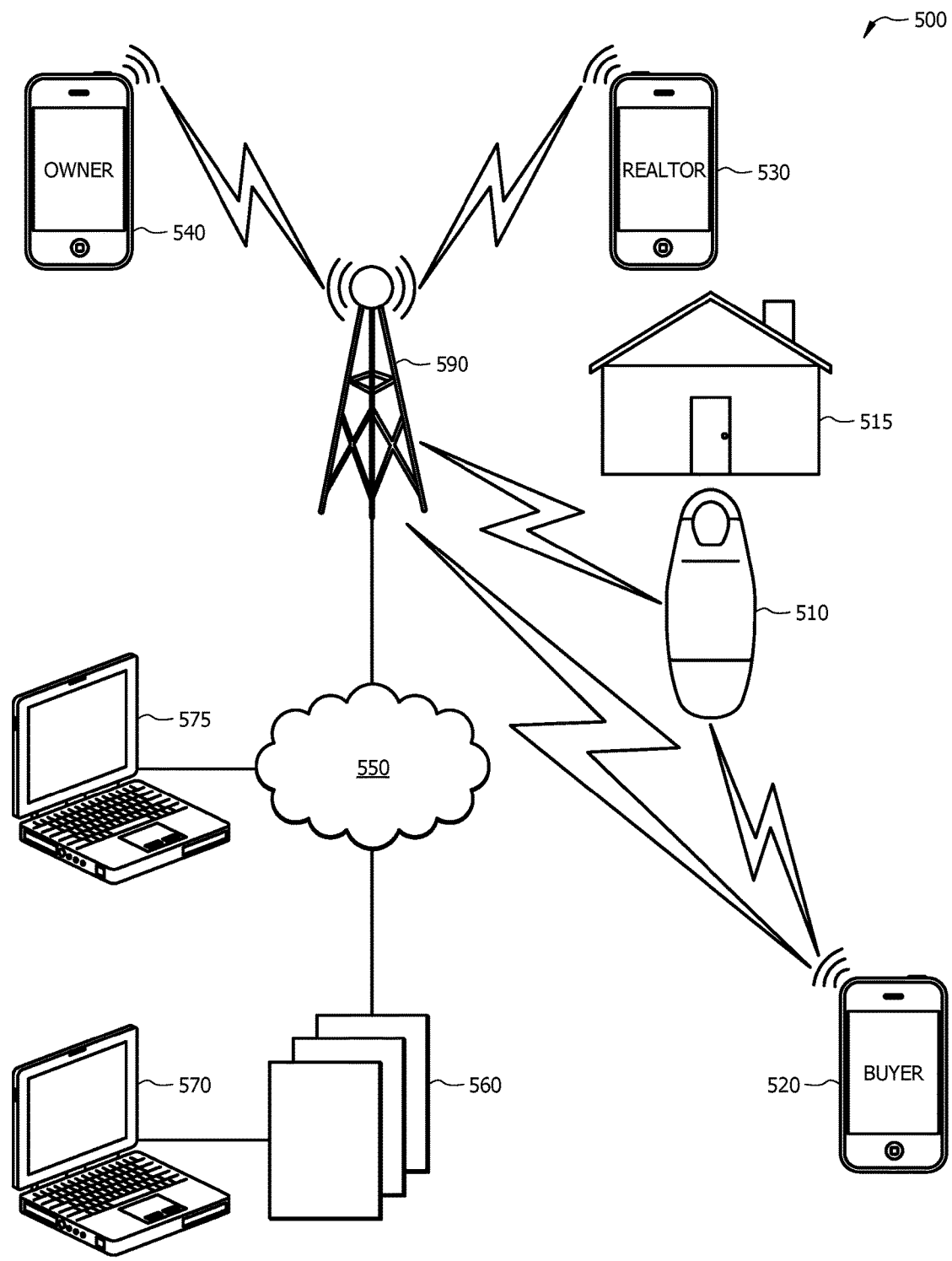
FIG. 5 is a diagram of a system embodiment under the present disclosure.

FIG. 5 displays a system 500 making use of the teachings of the present disclosure. Wireless lockbox 510 can be located at house 515, either attached to a door knob or otherwise placed at the house 515. Wireless lockbox 510 comprises both a Bluetooth and a cellular connection. Cellular network 590 allows the wireless lockbox 510 to communicate with the owner's device 540 and realtor's device 530. If buyer 520 is approved to tour the home 515, then buyer 520 can receive a code that buyer's device 520 can send to wireless lockbox 510 via Bluetooth, thereby opening the wireless lockbox 510 and obtaining the key to home 515. Devices 520, 530 and 540 can all run an application that manages communications between the devices and sets a showing schedule for home 515. The schedule can be approved by owner 540. In some embodiments a realtor can be in charge of unlocking the wireless lockbox 510. Servers 560 can store schedules, user IDs, home information, seller listings, and more. This data can be available to users 520, 530, 540 via network 550 and cellular network 590. Computer 570 can comprise an interface for servers 560. Computer 575 can comprise a user's computer (buyer, realtor, or owner) that can access servers 560 via network 550 and interact with components of the system via network 550 and cellular network 590.

FIGS. 6A-6G display embodiments of a typical interface and process for a user to create a profile and set up a home tour using the present disclosure. Interfaces 610-670 can comprise interfaces for a smartphone or other device. In FIG. 6A, a user can input personal information 612 (that can include various types of data) to create a profile. In FIG. 6B, a user, after searching for a specific zip code, or using a location determination system within a computing device, can see listings 622 of home or other properties for sale. Results of a search can also be displayed in a map view 632. After selecting a specific property, the user can see specific details 642, such as in interface 640. The user can also be presented with a command/button 644 to request a tour of the property. The user can then be presented with available times for a tour 652. The user can select a time. When the owner accepts the time, the user can be notified that their tour has been approved 660. When the user arrives at the house at the appointed time the application can provide a command that instructs the lockbox to open, via Bluetooth 672.

FIGS. 7A-7E display embodiments 710-750 of interfaces and processes that a property owner or seller may use when using the present disclosure's teachings. A realtor for a seller/owner might see similar interfaces. First an owner may need to create a profile by entering information such as name, address, etc. 712. An owner may also be able to upload pictures of the property 722. The owner can also enter information about the property 732, such as size, bedroom number, bathroom number, and more. The owner can also enter the property's availability for a tour 742. When a potential buyer requests a tour, the owner may receive the request 756 and be able to either accept 752 or reject 754 the request.

FIGS. 8A-8E shows embodiments of interfaces for logging in and using an account according to the present disclosure. Interface 810 shows a login page 812 by which users log in to an account. Interface 820 shows an account creation page 822 for new users. Interface 830 shows a user's home page 832 upon being logged in to the application. The home screen 832 can show options for accessing a home search 834, appointment list 836, My Toor 838, edit profile 831, property list 833, and an option to broadcast location 839. The home search 834 would mostly be used by users looking to possibly buy a home. Owners/realtors wishing to do market research may also use it. Property list 833 might mostly be used by realtors and owners to manage their various properties. Edit profile option 831 allows users to edit their information. An option to broadcast location 839 might mostly be used by realtors who want to advertise their location for clients, or turn such functionality off when desired, such as during a meeting. My Toor 838 provides access to an interface for managing a user's wireless lockboxes. A given user may be managing a plurality of wireless lockboxes. If a user selects edit profile 831 then an interface such as interface 842 may be displayed, allowing a user to edit a plurality of different areas. If a user selects property list 833 then an interface such as interface 852 may be displayed. Interface 852 may display a plurality of properties that the user is selling or managing.

Figure 8A:
Figure 8B:
Figure 8C:
Figures 8D, 8E, 9A:
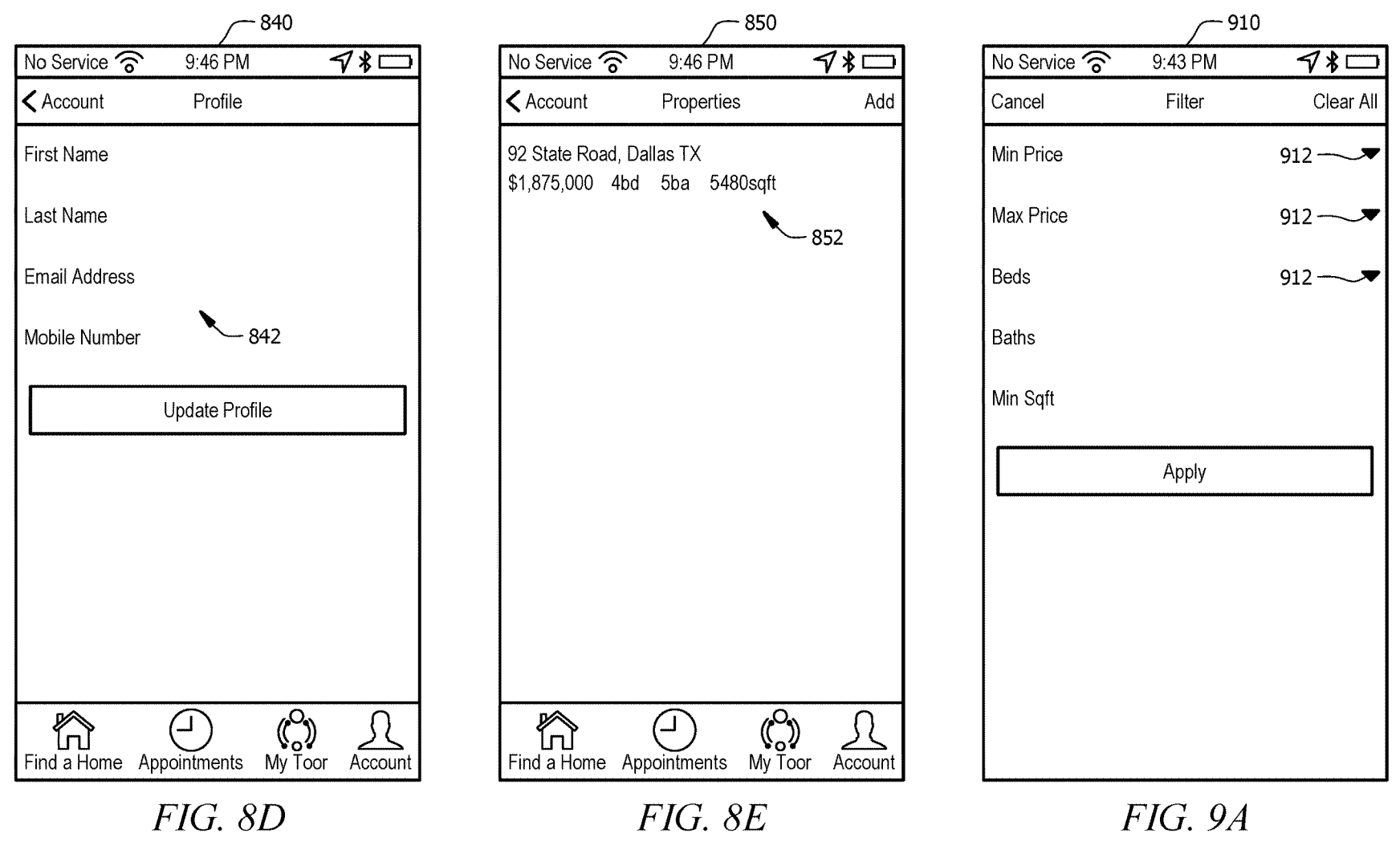
Figure 10A:
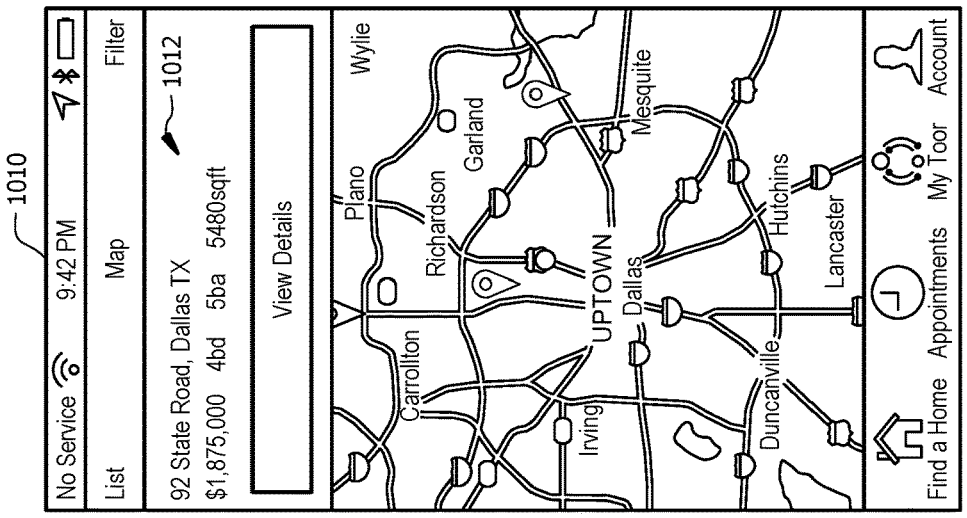
FIGS. 10A-10E are diagrams of user interface embodiments under the present disclosure.
Figure 9C:
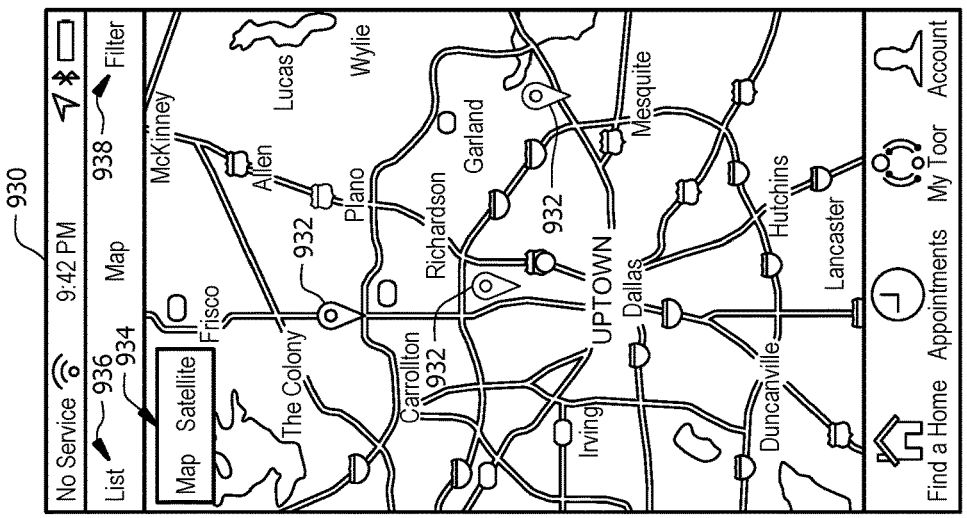
Figure 9B:
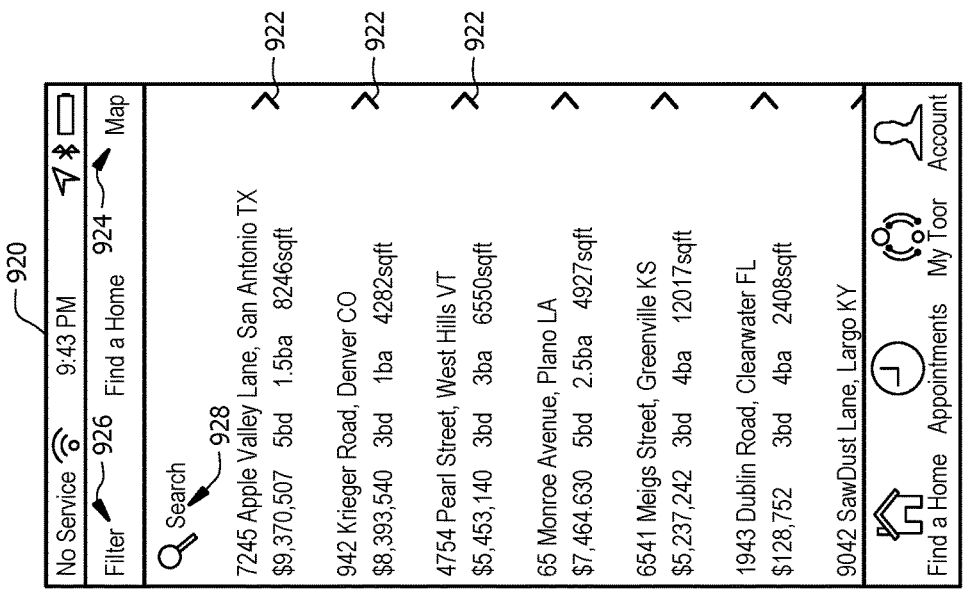
Figure 10D:
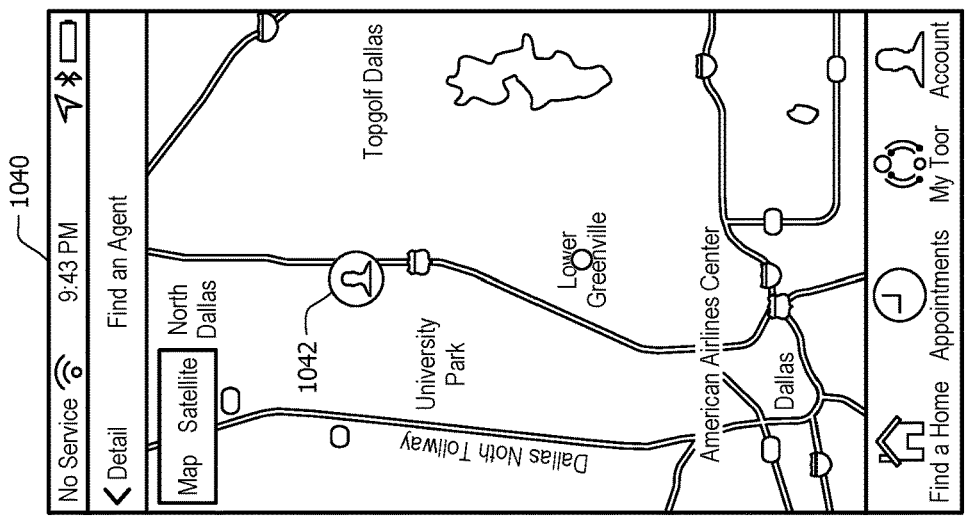
Figure 10C:
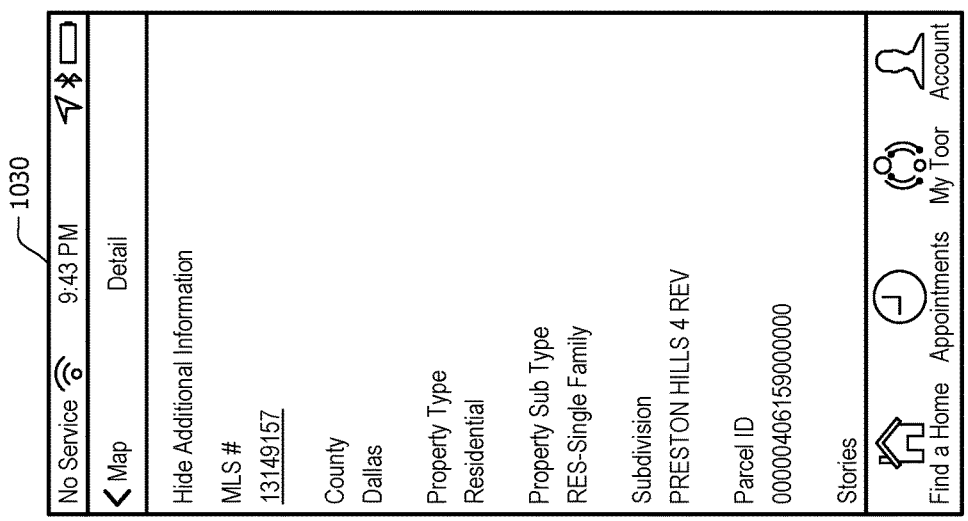
Figure 10B:
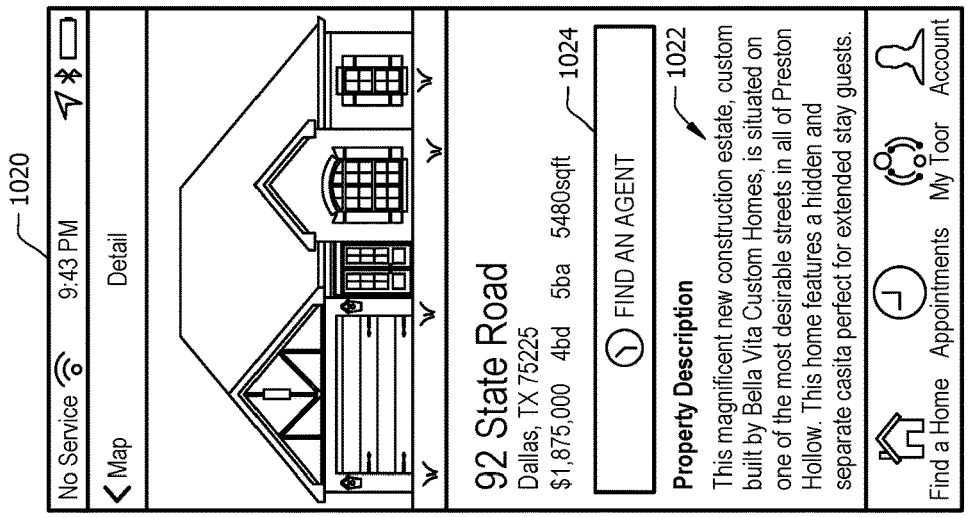

FIGS. 9A-9C display embodiments of interfaces for home searching such as when selecting the home search option 834 of FIG. 8C. FIG. 9A displays a possible embodiment of a filter interface 910. Using this interface, a user can select various criteria 912 such as minimum price, maximum price, beds, bathrooms, and more. FIG. 9B shows a results list interface 920 once a user has searched for various criteria. Interface 920 can display a plurality of search results 922. Search bar 928 allows the user to search among the results, such as for a street name or city. Filter option 926 returns the user to the filter page 910 or allows the user to further filter the results with additional filtering options. Map option 924 allows the user to see a map view of the search results. FIG. 9C displays a map interface 930 such as when a user selects option 924 in FIG. 9B. Map interface 930 displays search results 932 and options such as switching between map/satellite view 934. List option 936 returns the user to a list interface 920. Filter option 938 returns the user to the filter page 910 or allows the user to further filter the results with additional filtering options.

FIGS. 10A-10E display embodiments of interfaces for selecting a specific house and for interacting with a map view, such as map interface 930. Property interface 1010 display a property that's been selected from map view 930 or list view 920. Interface 1010 can show an option 1012 to see further details of a specific property. After selecting option 1012 the user may be able to see detail interface 1020. Detail interface 1020 can show further details or description 1022. A user can scroll down to see extra information interface 1030. An owner/seller may require that buyers tour a property with a real estate agent. Interface 1020 can provide a find an agent option 1024. After agent selection 1024 is made, a user may see agent locator interface 1040. Agent interface 1040 may display agents in a given locality who have made themselves available for services. In this embodiment a real estate agent 1042 is shown. When a user selects agent 1042 the application can display agent interface 1050. Agent interface 1050 can show time or appointment details 1052 and an option to request the agent's escort 1054 at the property.

Figure 11B:
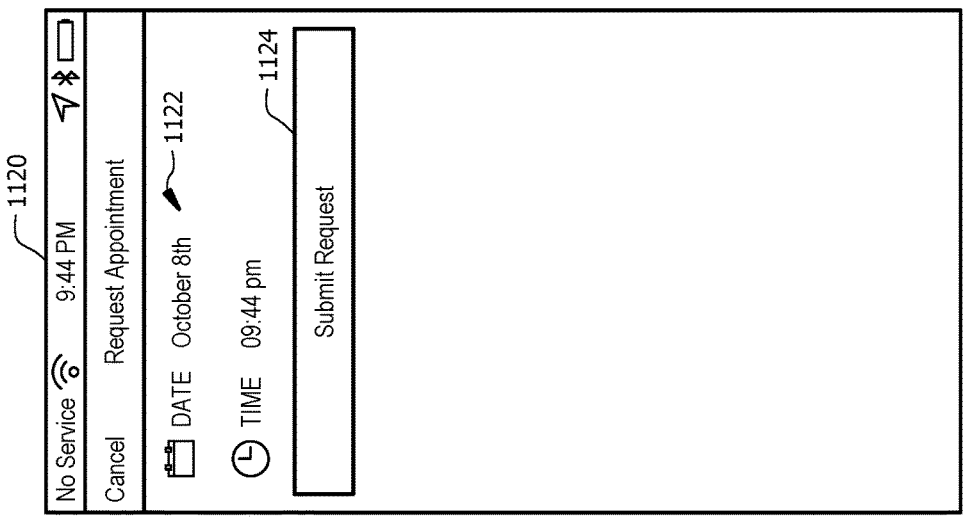
FIGS. 11A-11B are diagrams of user interface embodiments under the present disclosure.
Figure 11A:
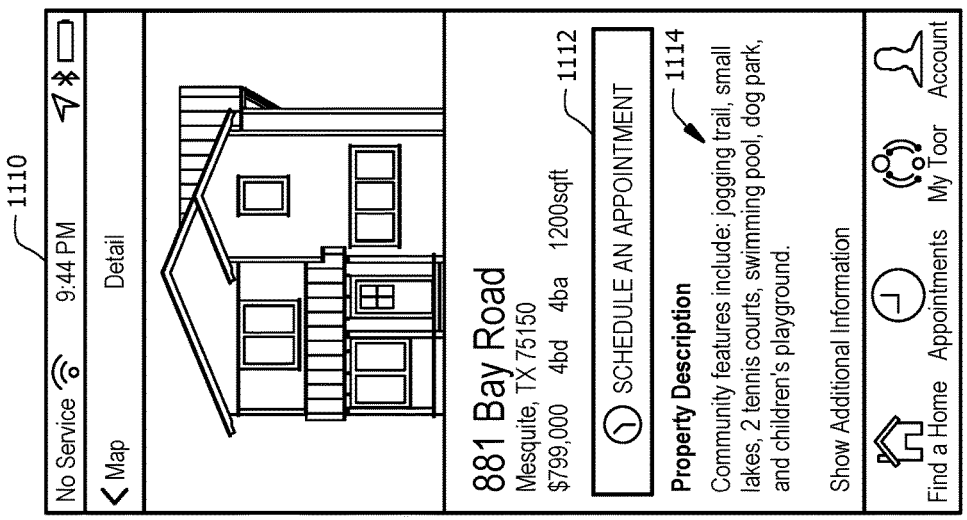
Figure 10E:
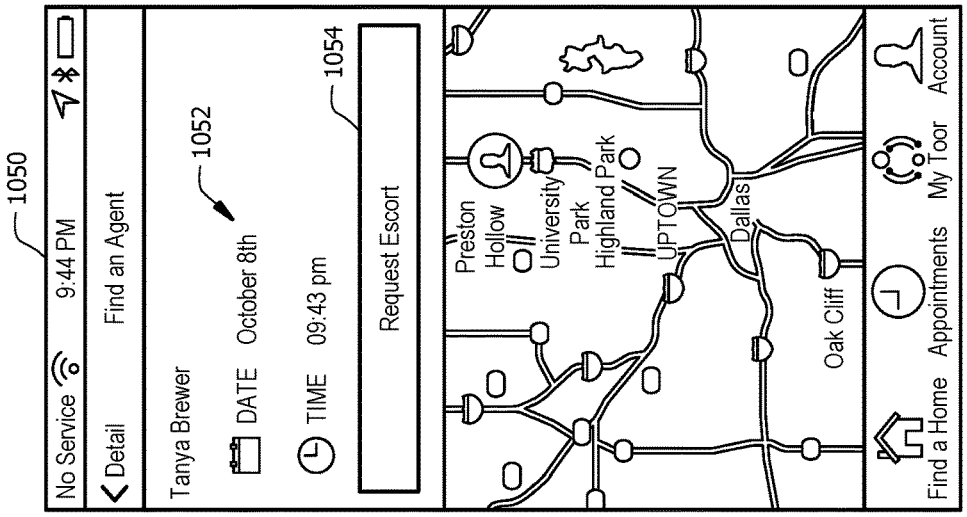

FIGS. 11A-11B show alternative embodiments of detail interfaces for viewing details of a property and scheduling a tour or appointment. Detail interface 1110 can be viewed after selecting a specific property from a list view 920 or map view 930, 1010. Detail interface 1110 can be an alternative to detail interface 1020. Detail interface 1110 shows details 1114 about a selected property and also provides a button or other selection mechanism to schedule an appointment 1112. Upon selecting to schedule an appointment 1112 the user may be presented with appointment interface 1120. The user may be able to edit the time/date 1122 and then submit the request 1124. The request can be sent to the property owner for approval.

Figure 12A:
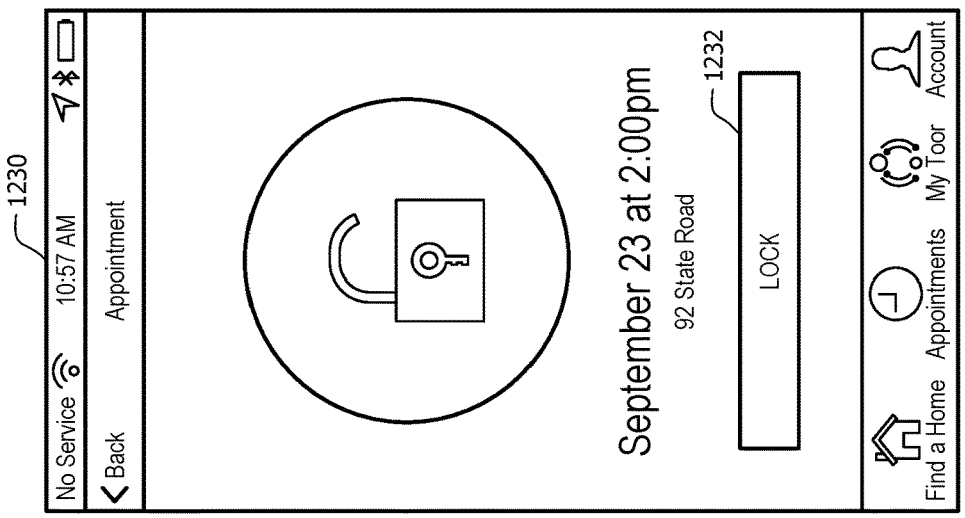
FIGS. 12A-12C are diagrams of user interface embodiments under the present disclosure.
Figure 12B:
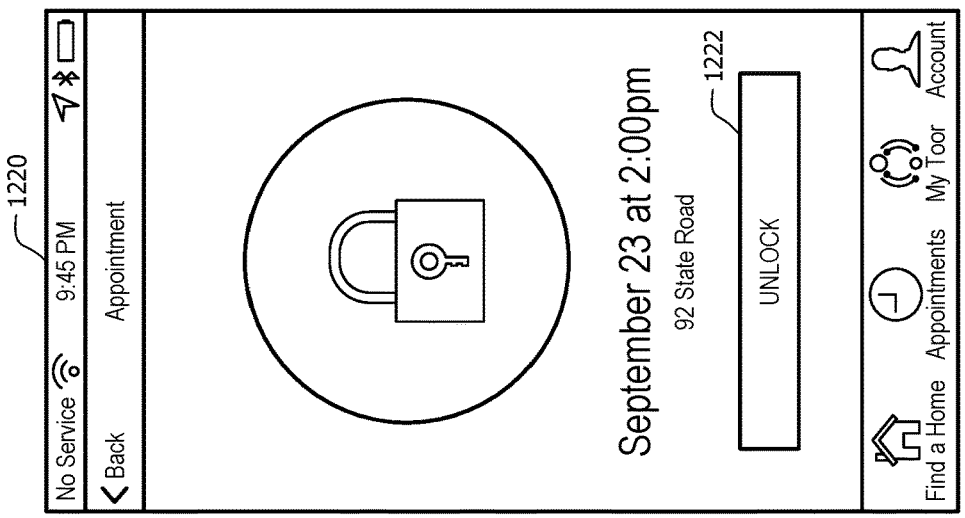
Figure 12C:
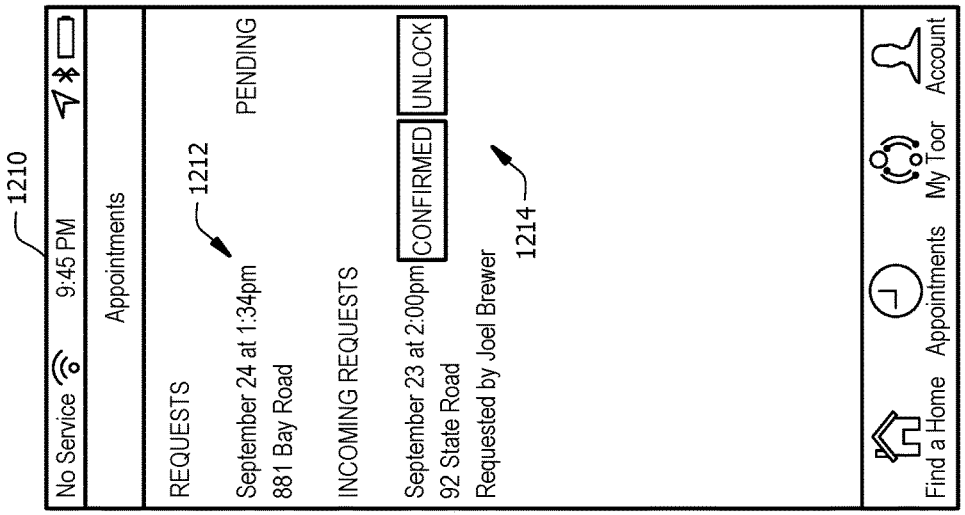

FIGS. 12A-12C display possible embodiments of application interfaces by which an owner can receive, review, and manage appointment requests. In some situations, these interfaces may be used by realtors who are managing a sale of a property. After a potential buyer submits an appointment request 1124, the owner may view that request in appointment interface 1210, such as pending request 1212. Already approved requests 1214 can also be displayed. The owner can click on the pending request and perform different functions such as accepting the request, denying the request, proposing another time, or other actions. Already approved requests 1214 can display an unlock or open command so that the owner can unlock the wireless lockbox at (for example if the buyer/realtor is unable to open the lockbox locally for some reason). By clicking on a request, a user may also be able to view an interface 1220 or 1230. Interfaces 1220 and 1230 can provide the owner with the ability to either unlock/open/deploy 1222 or lock/close/retract 1232 the wireless lockbox at the property by opening or closing the tray. In some embodiments, a single interface can comprise the commands Lock, Unlock, Close, and Open. In such embodiments the 'Unlock' command can make the wireless lockbox available to others for opening, while 'Open' actually opens the lockbox. Similarly, in such embodiments, the 'Lock' command could make the lockbox completely unavailable to other users, possibly if there's a security emergency. 'Close' could close the lockbox by retracting the tray.

Figure 13A:
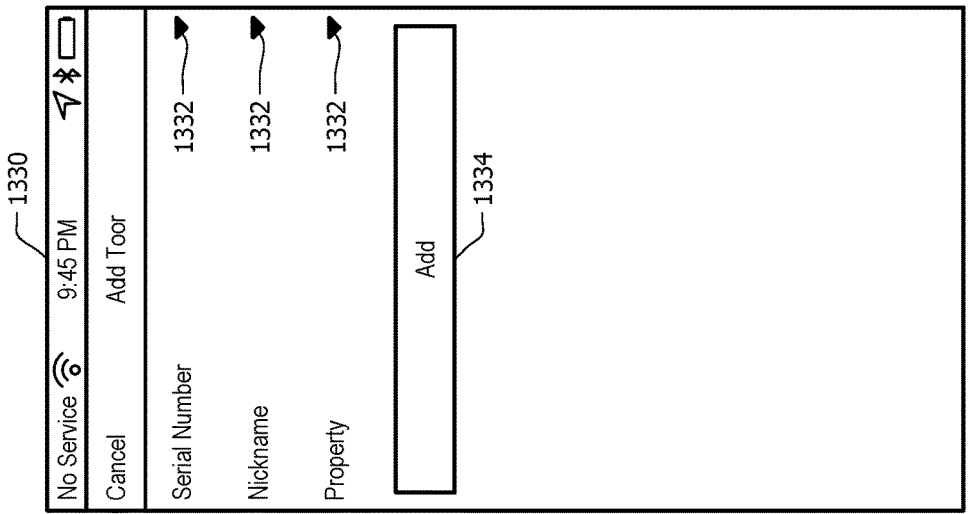
FIGS. 13A-13C are diagrams of user interface embodiments under the present disclosure.
Figure 13B:
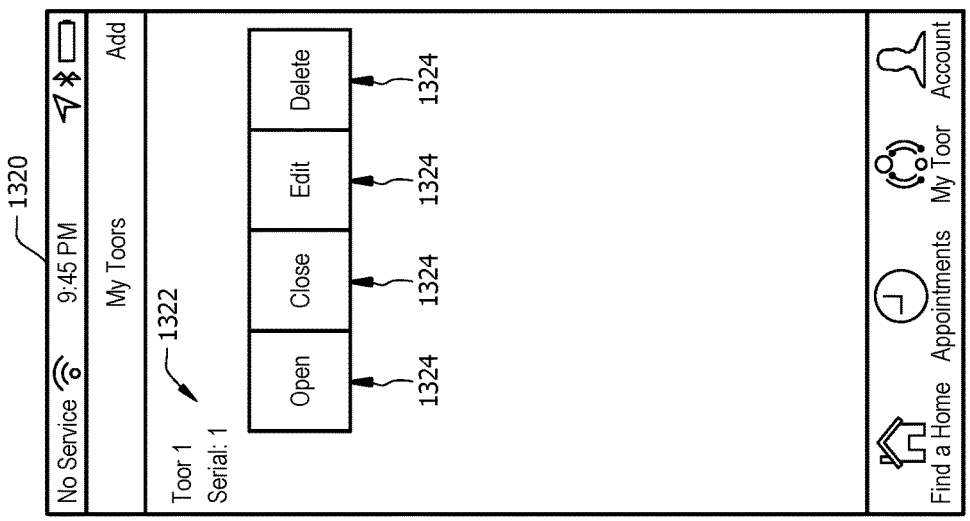
Figure 13C:
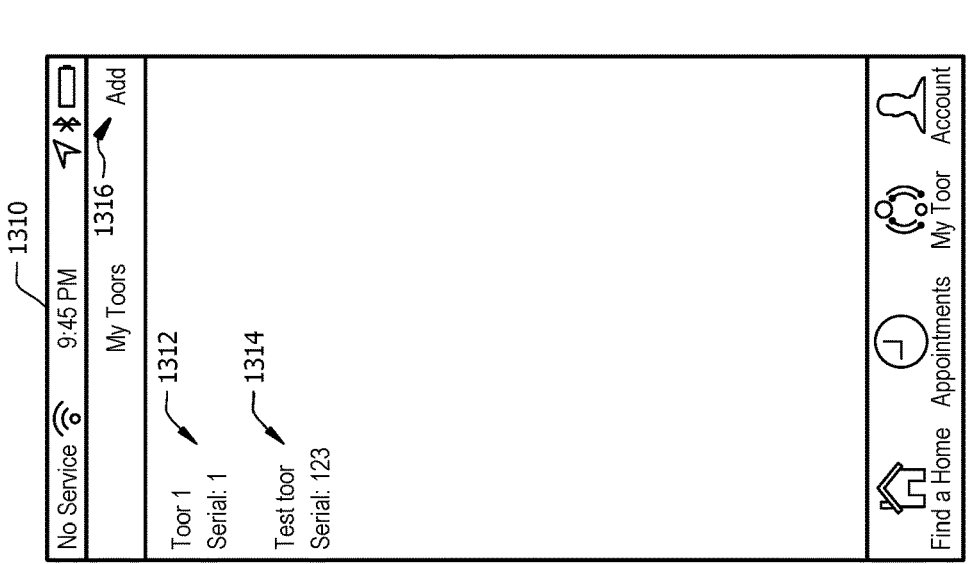

If a user selects My Toor 838, such as from account interface 830 in FIG. 8C, the user can be presented with an embodiment of a My Toor interface 1310 such as in FIGS. 13A-13C. In My Toor interface 1310 a user can view records 1312, 1314 reflecting all of the user wireless lockboxes. Some of the wireless lockboxes can be in use such as 1312. Other wireless lockboxes may be test units 1314. The user can be presented with an option to add a wireless lockbox 1316. Clicking/selecting a wireless lockbox such as 1312 can bring the user to a wireless lockbox interface 1320 where the particular wireless lockbox 1322 can be managed. The user can be presented with a variety of options 1324 to manage the wireless lockbox 1322, such as open, close, unlock, lock, edit, delete, and others. If a user selects to add a wireless lockbox 1316, the user can be presented with adding interface 1330. The user can enter wireless lockbox information 1332 and then add 1334 the wireless lockbox to their account. Once a wireless lockbox is added to the user's account, the user can then manage the wireless lockbox remotely. Servers such as servers 560 in FIG. 5 can associate the user's account with the user's particular wireless lockboxes and allow the user to log in to their account via mobile devices or computers, and control the wireless lockbox via a wireless network, such as cellular (or in alternative embodiments via Wi-Fi or another network).

Figure 14:
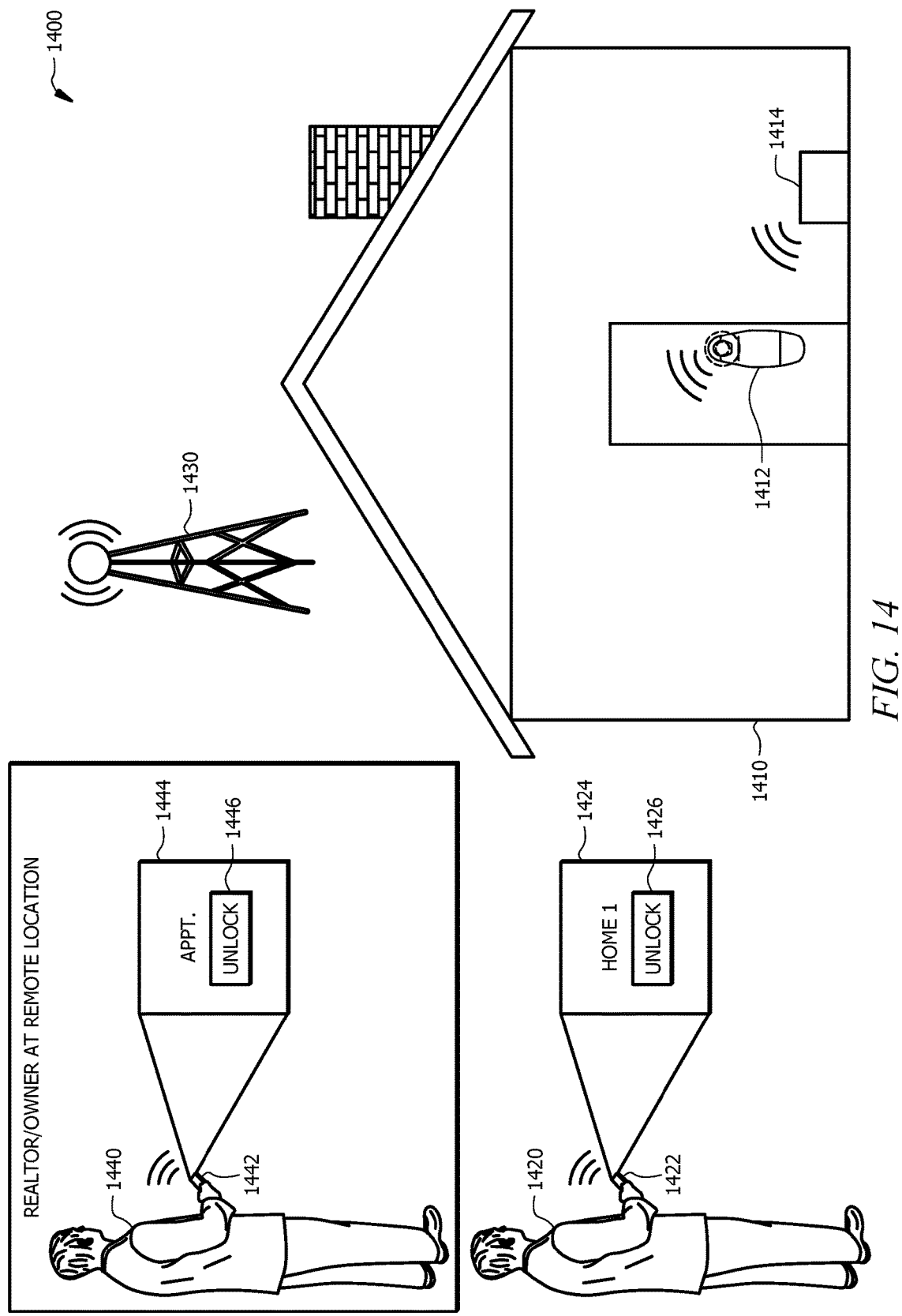
FIG. 14 is a diagram of a system embodiment under the present disclosure.

FIG. 14 displays an embodiment of a system under the present disclosure wherein a potential buyer 1420 approaches a house 1410 for a pre-approved tour. Buyer 1420 can approach the house at then pre-approved appointment time. The buyer's mobile device 1422 can be equipped with both cellular and Bluetooth functionality. The wireless lockbox 1412 can be equipped with cellular and Bluetooth functionality (and option Wi-Fi functionality). When the buyer approaches the house, he can open the appropriate application on the mobile device 1422 and see interface 1424. The buyer may need to power on the wireless lockbox 1412 (or the wireless lockbox 1412 may already be powered on). Powering on the wireless lockbox 1412 can require flipping a switch or pressing down on a button, or in some embodiments the wireless lockbox 1412 can be woken via a wireless signal. The user can then select unlock function 1426 from the wireless device 1422. LED lights or a screen can indicate the status (on/off/transmitting/etc.) of the wireless lockbox 1412. Selecting unlock 1426 can use the mobile device 1422 Bluetooth chip to convey a Bluetooth communication to wireless lockbox 1412 commanding to the wireless lockbox 1412 to open and provide the house key. The buyer 1420 can then enter the house, view the house, and then return the key to the wireless lockbox 1412. The buyer 1420 can then select a lock function from the application and the wireless lockbox 1412 can close and lock the key inside. In most embodiments, the buyer's mobile device 1422 can only be able to unlock the wireless lockbox 1412 during the pre-approved time slot. Remote servers, such as servers 560, or the owner's wireless device 1442, communicate with wireless lockbox 1412 to set the appointed time slot for buyer 1420. Only during that pre-approved time slot can buyer 1420 be able to unlock the wireless lockbox 1412.

Wireless lockbox 1412 comprises Bluetooth functionality to communicate with buyer wireless device 1422 but also comprises cellular functionality to communicate with owner wireless device 1442. Some embodiments can also comprise Wi-Fi functionality in the wireless lockbox 1412 to communicate with a wireless router 1414. Servers 560 and/or owner wireless device 1442 (or other computing devices as desired) can therefore manage the wireless lockbox 1412 remotely. Commands can be sent to the wireless lockbox 1412 from the owner or from the servers 560. Software updates can also be sent via cellular network 1430 or wireless router 1414.

When a buyer 1420 has finished touring house 1410, he can put the key back in the wireless lockbox 1412, and press a lock command/button on the wireless device 1422/interface 1424. The wireless lockbox 1412 can ascertain whether the key is within the lockbox. If the key is not returned to the wireless lockbox 1412 within the pre-approved time slot, the owner 1440 or servers 560 can be notified. This serves as an anti-theft functionality. If a key is stolen, the servers 560 and/or owner 1440 can determine the last approved visit and the responsible user.

When a buyer 1420 has finished touring house 1410, he can put the key back in the wireless lockbox 1412, and press a lock command/button on the wireless device 1422/interface 1424. The wireless lockbox 1412 can ascertain whether the key is within the lockbox. If the key is not returned to the wireless lockbox 1412 within the pre-approved time slot, the owner 1440 or servers 560 can be notified. This can serve as an anti-theft functionality. If a key is stolen, the servers 560 and/or owner 1440 can determine the last approved visit and the responsible user.

FIG. 14 has been described with a potential buyer 1420 and an owner 1440. However, in certain situations or embodiments either or both persons may be realtors or other individuals.

The functionalities of the interface embodiments of FIGS. 6A-14 can be used for buyer interfaces, seller interfaces and realtor interfaces, where appropriate.

As shown in FIG. 4, the wireless lockbox can comprise a micro USB connection 450. Other embodiments may use a USB port or other means of charging or otherwise connecting the wireless lockbox to another computing device. The micro USB connection can be used to charge the device. It may also be used to connect the wireless lockbox to a computer to download/upload information, update software, or for other uses. Alternatively, the wireless lockbox can connect to computers or other computing devices via Wi-Fi, Bluetooth, or other wireless means. Furthermore, some embodiments may comprise wireless charging capabilities. If a wireless lockbox can charge wirelessly, and if updates and other connections can be made wirelessly, then a micro USB or USB connection may not be necessary.

Drawer motor 435, in FIG. 4, can comprise any type of actuator or other mechanism for opening a tray containing the house key. The opening mechanism could be electromechanical, magnetic, fluid-based, or another system. Relatedly, the key door sensor 445 can comprise any type of sensor for detecting when the key tray is closed or open. This part can also be optional.

The on/off switch 425 of FIG. 4 can comprise a variety of different power mechanisms. In a preferred embodiment on/off switch 425 can comprise a pressure sensitive switch under the LED lights 320 of FIG. 3A. LED lights 320, 430 can be arranged in a variety of patterns and/or colors. For example, a user may press down on switch 320 to power on the wireless lockbox 300. The LED lights may then turn a certain color, such as green. During unlocking the LED lights may turn orange or rotate among a chosen series of colors. Turning a wireless lockbox off may cause the lights to turn red and then power down. LED lights 320, 430 may also be used to notify users when the battery is low.

The users of the teachings disclosed herein may need to use an application or software package to participate in the systems and methods described. Certain software may be needed on various computing devices of FIG. 5, such as servers 560, computers 570, 575, and mobile devices 520, 530, and 540. Software can be downloaded and installed from the internet, from a flash drive or other mechanism. Applications for mobile devices such as smartphones or tablets can be downloaded and installed from an application store or other mechanism.

Servers 560 of FIG. 5 can comprise a plurality of servers and/or computers. Servers 560 can store real estate listings from users of the system (owners and realtors creating real estate listings) and can also pull in other real estate listings from other resources. Servers 560 can also store data associating various wireless lockboxes with the respective owner and/or realtor. Servers 560 can therefore store user information for owners, realtors, and buyers. Servers 560 can also store information and functionality allowing certain users to control wireless lockboxes and send open, lock, and other commands. In some embodiments, servers 560 can comprise connections to financial institutions for various functionality such as sending and receiving information related to credit checks, or home loan information. For instance, in some embodiments a home owner may only allow home visits from potential buyers with a credit score of 700, or some other criteria.

To track and manage wireless lockboxes, servers 560 may assign an identification number to each wireless lockbox. When a user activates a wireless lockbox the servers 560 can associate the identification number to the user. The identification number can be matched with various identification numbers used by wireless networks and telecommunication networks. For instance, a wireless lockbox's identification number/name may be associated with a MAC number, IMEI number, IP address or other value. Servers 560 can also comprise, or access at another location, directions for sending messages to a wireless lockbox depending on what network the lockbox is on (such as a given cellular network).

When a user sends a command to a wireless lockbox, such as in FIG. 5, the command may, in some embodiments, go to servers 560 and then to the wireless lockbox 510. Alternatively, a command from a user, owner 540 for example, may be directed directly to wireless lockbox 510 over cellular network 590. A copy of the command may also be sent to servers 560 to be recorded. Some embodiments may utilize a Wi-Fi network at house 515 to communicate with wireless lockbox 510. A Wi-Fi network may be used in lieu of a cellular network or as a backup network to a cellular network.

Referring to FIG. 14, during a pre-approved time slot the buyer 1420 can be able to use the wireless device 1422 to unlock the wireless lockbox 1412. In most embodiments this can be done by the wireless device 1422 communicating with the wireless lockbox 1412 via Bluetooth. The communication can comprise an unlock code. The unlock code can comprise a unique code/signal for each wireless lockbox that is set ahead of time and never changes. Alternatively, the unlock code can comprise a continuously changing code that is updated by servers 560 in FIG. 5. Other embodiments may change the code at various intervals, or the code may be determined by time of day, week, or other settings. The code can comprise encryption (beyond normal Bluetooth or other wireless protocol encryption) such that only the associated software on the wireless device and wireless lockbox can decrypt it. The encryption can comprise PGP encryption, public key encryption, random number generation, hash functions, or other types of encryption protocols.

As shown in FIG. 2, a preferred embodiment of the wireless lockbox 200 can comprise an arm 240 for attachment to a door knob. The arm can be locked and unlocked by the microprocessor controlling the wireless lockbox. The arm can be unlocked remotely by servers 560 or the owner's mobile device or other computing device. Attaching and locking mechanisms can differ among different embodiments.

Wireless lockboxes as described herein can comprise a plurality of tamper sensors. Accelerometers, piezoelectric sensors, proximity sensors, temperature sensors, GPS interfaces, and other types of sensors can be used. The tamper sensor can be coupled to the microprocessor such that the wireless lockbox can report on its security status to the servers 560 or to the owner's mobile device or other computing device. Tamper sensors can include sensors within the wireless lockbox. Alternatively, a separate sensor can detect when a wireless lockbox has been removed a certain distance from the home owner's property.

Embodiments of the invention can comprise a charger for power supply 465 (of FIG. 4). Power supply 465 may be replaceable, such as a lithium-ion battery that can be swapped out and recharged. Alternatively, the battery may be non-removable and the user may have to dock the entire wireless lockbox in a charging station. Micro USB 450 can be used to charge the power supply 465.

Figure 18:
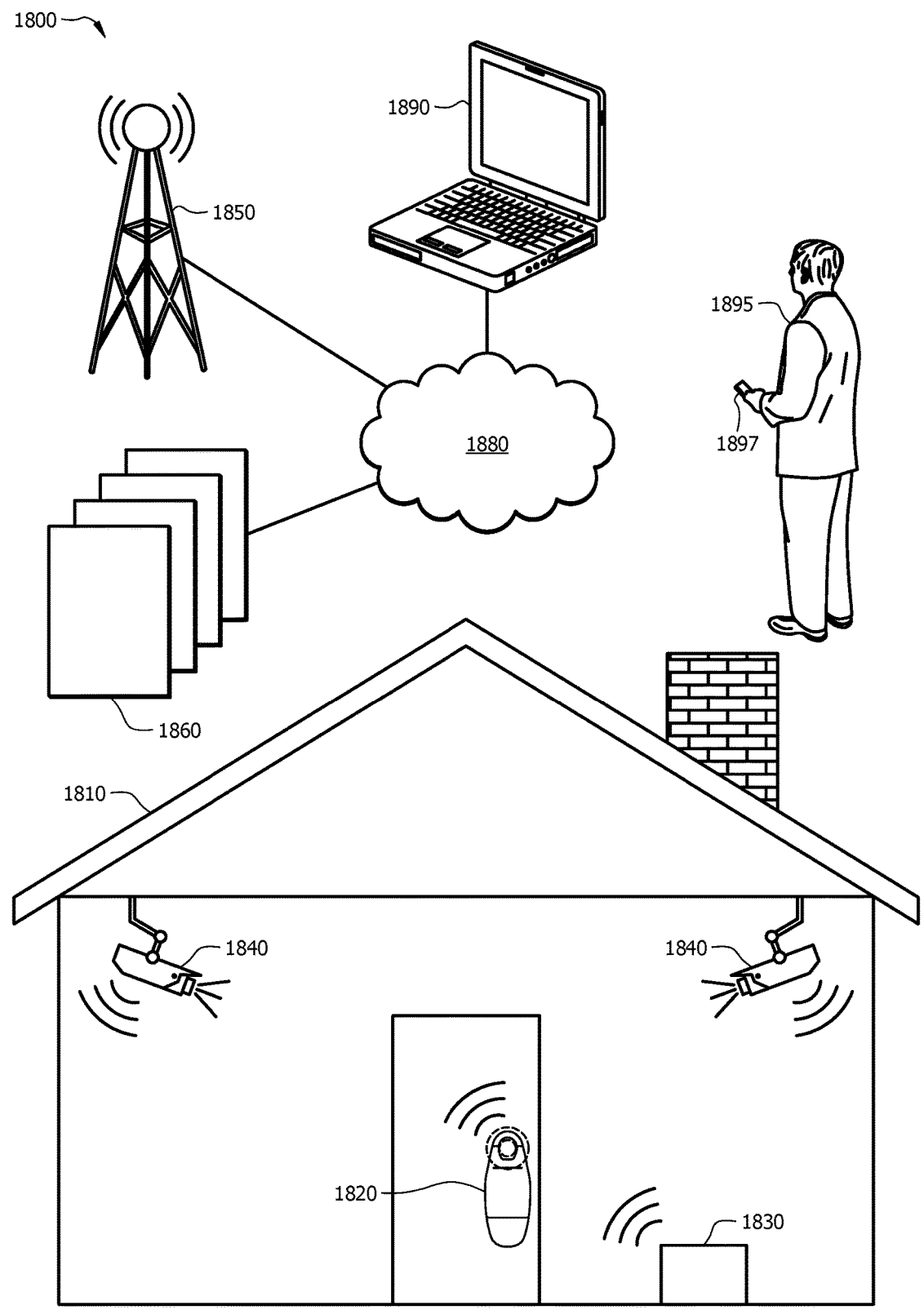
FIG. 18 is a diagram of a system embodiment under the present disclosure.

Embodiments of the invention can also comprise a security camera. The camera can be placed at the home seller's desired location. Similar to the lockbox and security key, the camera can have a wireless connection, allowing the seller to access and view a video feed from a remote location. This can give the seller added capabilities regarding security when selling a home. FIG. 18 displays an embodiment under the present disclosure including security cameras. System 1800 includes a wireless lockbox 1820 at a house 1810. Inside the house the owner may place a plurality of security cameras 1840. The security cameras can be placed wherever the owner desires (resting on tables, hung from the ceiling, etc.) and the cameras can comprise wireless or wired connections to other components. As shown, a Wi-Fi router 1830 can communicate with wireless lockbox 1820 and security cameras 1840. A hard drive can be provided locally to stored video (not shown) or video can be uploaded to servers 1860 (which can comprise servers 560 of FIG. 5. An owner 1895 can use his mobile device 1897 to access a video stream of security cameras 1840. The owner can also access a video stream from a computer 1890. The video stream provided to the owner 1895 can be a direct communication from wireless router 1830, or wireless router 1830 can provide the video to servers 1860 which then send the video to the owner 1895. Cellular 1850 and network 1880 (such as the internet) can provide communication between various components. In other embodiments the security cameras 1840 can comprise a plurality of communication interfaces, both wired and wireless, to assist in providing video to users.

Figure 15:
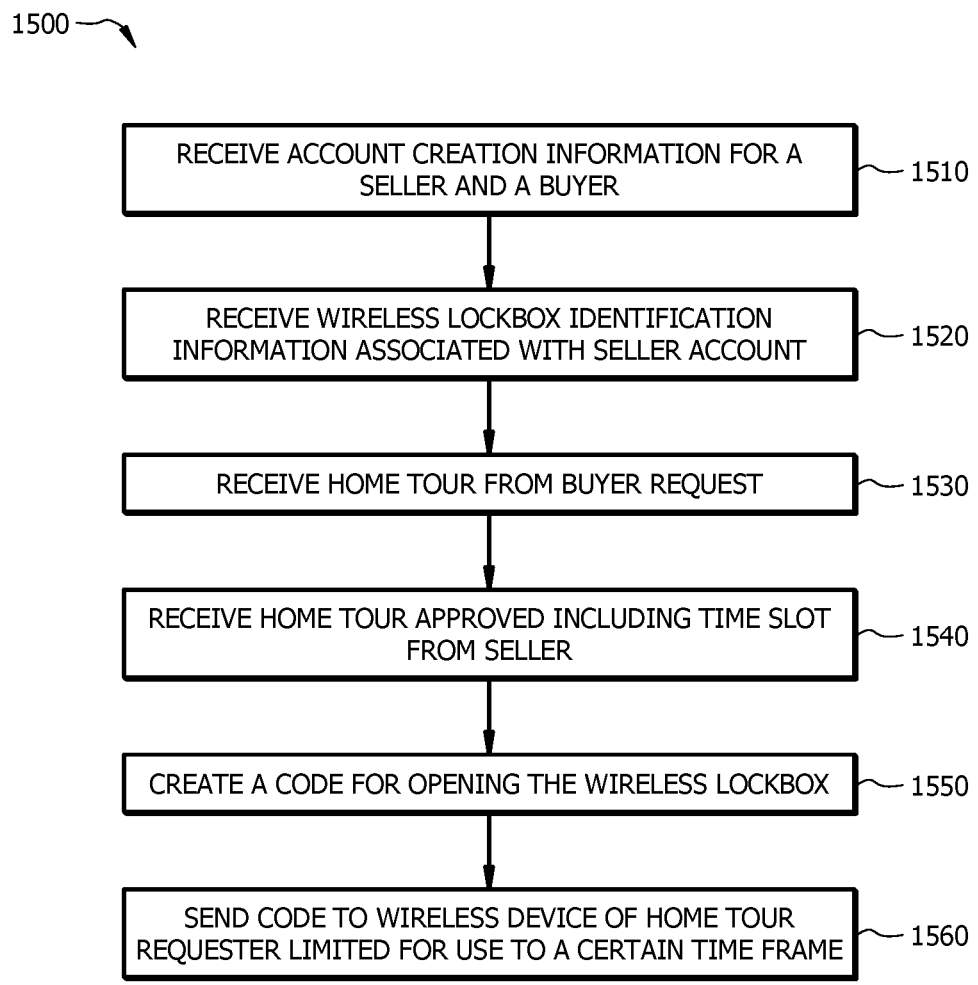
FIG. 15 is a flow-chart diagram of a method embodiment under the present disclosure.
Figure 16:
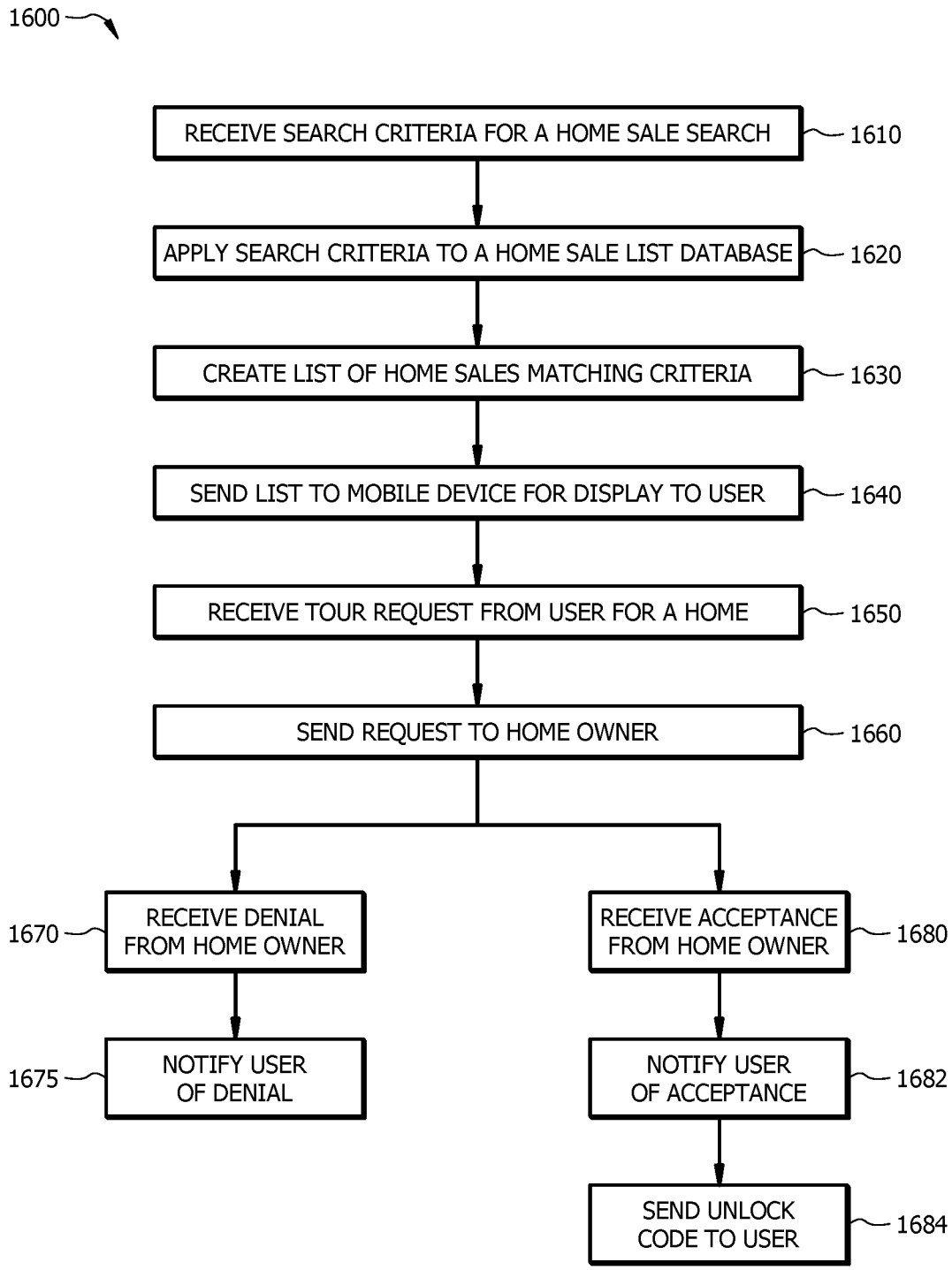
FIG. 16 is a flow-chart diagram of a method embodiment under the present disclosure.
Figure 17:
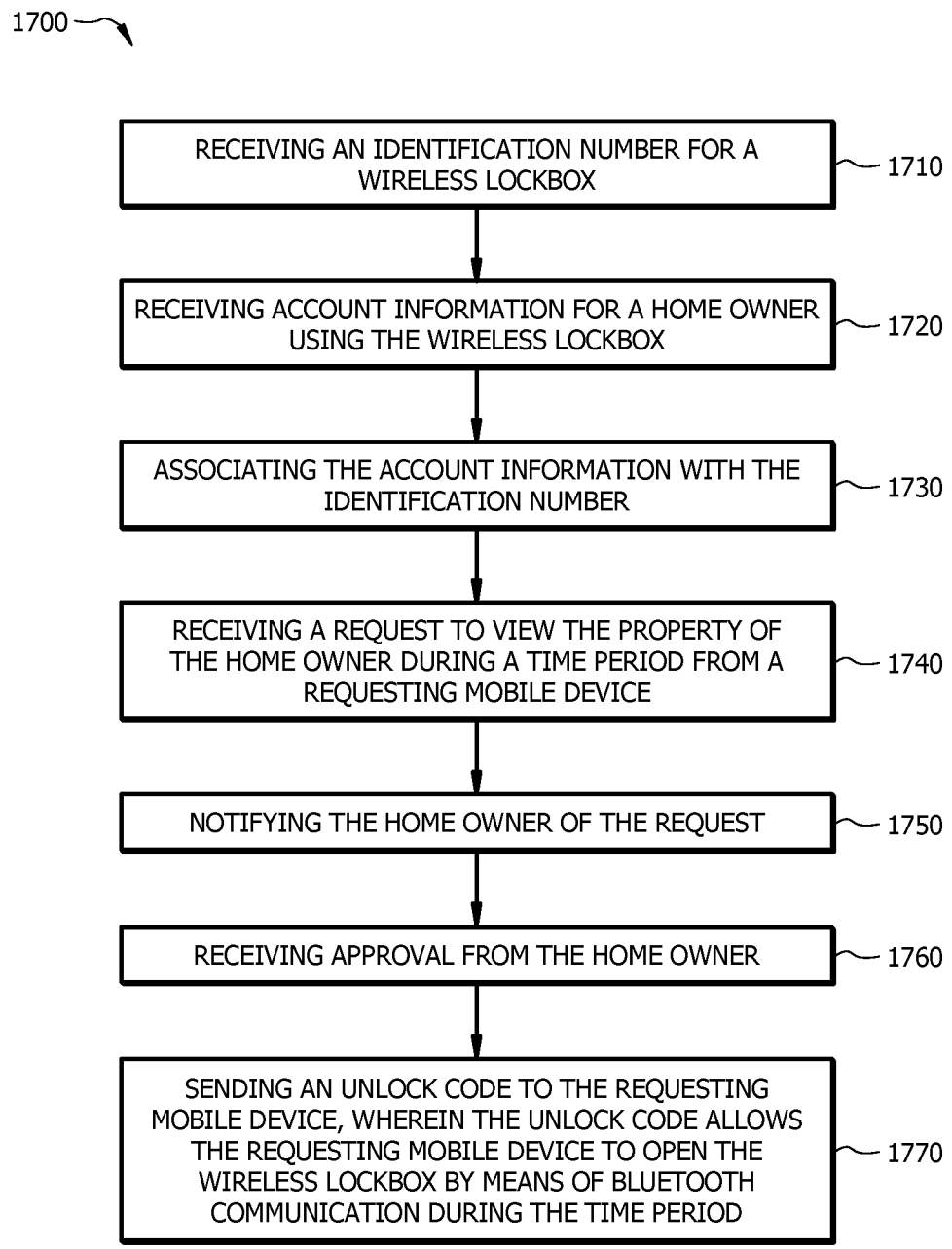
FIG. 17 is a flow-chart diagram of a method embodiment under the present disclosure.

FIGS. 15-17 display embodiments of methods under the present disclosure. In a preferred embodiment these methods can be carried out by a plurality of servers. Other arrangements of computers or devices can perform the processes described.

FIG. 15 displays a method embodiment under the present disclosure. Account creation formation for both a seller and a potential buyer can be received 1510. Then, wireless lockbox identification information can be associated with the seller account 1520. Then, a request to tour a home can be received from a potential buyer 1530. Approval of the request can be received 1540. After approval, an unlock code can be created to open the wireless lockbox 1550. The code can be sent to the wireless device of the home tour requester, wherein the code is limited to use during a certain time frame 1560.

FIG. 16 displays another embodiment of a method under the present disclosure. Search criteria can be received regarding a search for homes for sale 1610. The search criteria can be applied to a home sale list database 1620. A list of matching homes can be created 1630. The list can be sent to a mobile device for display to a user 1640. A tour request can be received from the user's mobile device 1650. The request can be sent to the home owner 1660. If the home owner rejects the request, the rejection can be received 1670 and the user can be notified 1675. Alternatively, the home owner may accept, their acceptance can be received 1680. The user can be notified 1682. An unlock code for a wireless lockbox can be sent to the user/wireless device 1684.

FIG. 17 displays another embodiment of a method under the present disclosure. An identification number of a wireless lockbox can be received 1710. Account information for a home owner using the wireless lockbox can be received 1720. The account information can be associated with the identification number 1730. A request to view the property of the home owner during a time period can be received from a requesting mobile device 1740. Approval of the request can be received 1760. An unlock code to the wireless lockbox can be sent to the requesting mobile device 1770. In most embodiments, the unlock code can only be functional during the time period agreed to by the home owner.

Further embodiments under the present disclosure can provide for a rating system of properties and/or realtors. Users, under their account screen on an application, can be presented with an interface for rating properties and/or realtors or agents. Rating can be done via a numerical system (e.g. on a scale of 1-4, or 0-10, etc.) and/or with users leaving written feedback or reviews. Users may be able to rank properties or realtors or agents according to various criteria such as location, friendliness, cleanliness, etc. Ratings can be stored, maintained, received and sent via a plurality of servers, such as servers 560 in FIG. 5.

Another embodiment of the present disclosure can allow sellers to receive bids and offers for their house via their mobile device. Each side to a negotiation can submit bids and counter-offers, edit listing prices and make other edits to a listing or profile. Users can send each other questions and messages and send responses. Users may also be able to accept and sign contracts using the application provided. Offers, bids, counter offers, messages, and signed contracts can be stored, maintained, received and sent via a plurality of servers such as servers 560 in FIG. 5.

Further embodiments under the present disclosure can provide for removable skins for wireless lockboxes. Removable skins can comprise a variety of materials such as silicone, polyester, rubber or other appropriate materials. Removable skins can comprise separate portions for a main body portion and a locking tray portion of the wireless lockbox. Removable skins can also comprise a single piece.

Figure 19:
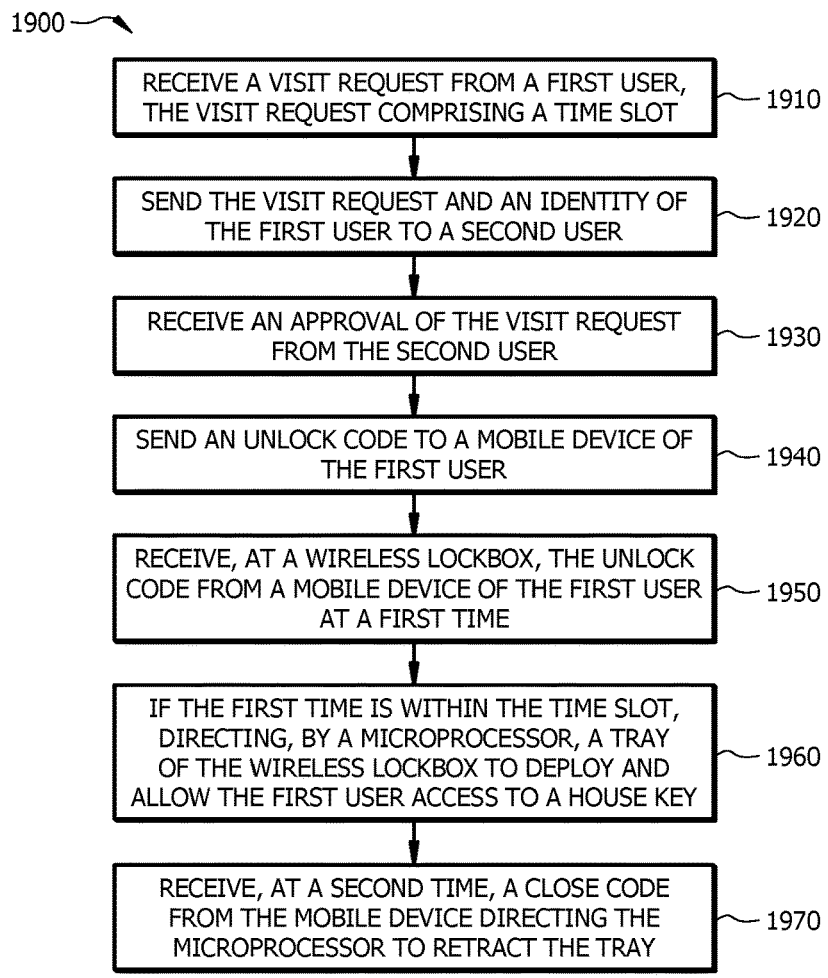
FIG. 19 is a flow-chart diagram of a method embodiment under the present disclosure.

FIG. 19 displays another possible method embodiment 1900 under the present disclosure. At the first step 1910, a visit request is received from a first user, the visit request comprising a time slot. At 1920, the visit request and an identity of the first user is sent to a second user. At 1930, an approval of the visit request is received from the second user. At 1940, an unlock code is sent to a mobile device of the first user. At 1950, the unlock code is received at a wireless lockbox from the mobile device of the first user at a first time. At 1960, if the first time is within the time slot, a microprocessor directs a tray of the wireless lockbox to deploy and allow the first user access to a house key. At 1970, at a second time, a close code is received at the wireless lockbox from the mobile device that directs the microprocessor to retract the tray, meaning the house key can be locked inside. Both the deploying/opening and the retracting/closing of the tray can be done by pressing a command on a mobile device, such that the opening and closing can be completed without further human physical interaction. In some embodiments, a key sensor (440 of FIG. 4) in the wireless lockbox may prevent the tray from closing if the house key is not contained in the tray.

In some embodiments under the present disclosure, the key door sensor 445 of, for example, FIG. 4, can be operable to detect blockage of the tray as it is being retracted or closed. This may occur, for example, if a person's finger or clothing is trapped in the tray or wireless lockbox as the tray is being retracted. The key door sensor 445 (or another sensor) can monitor power consumption of the motor 435. If power consumption unexpectedly jumps, signaling a slowing of the drawer/tray's movement, then there may be a blockage. When such a stall is detected, the key door sensor 445 can then, by itself, or via the microprocessor 405, stop the motor, actuator, or other element that is closing the tray. There can also be a command to open/deploy the tray. This can help protect users.

Figure 20:
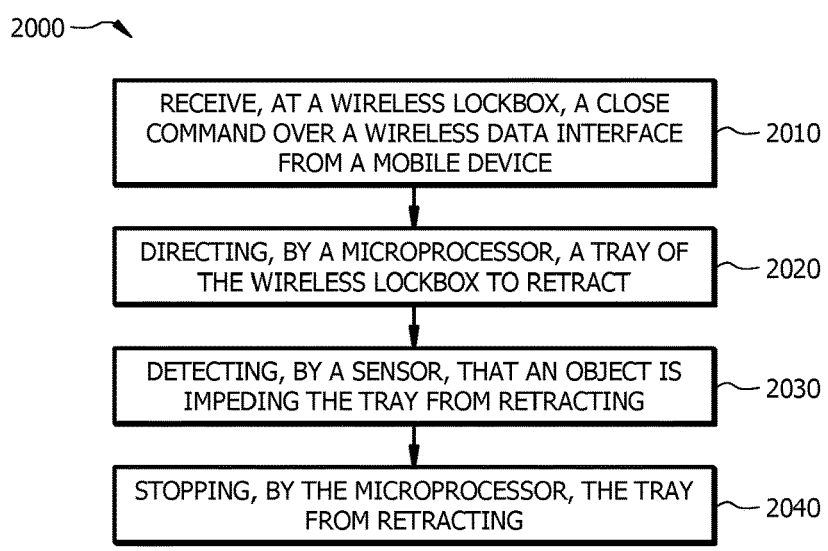
FIG. 20 is a flow-chart diagram of a method embodiment under the present disclosure.

FIG. 20 displays a possible method embodiment 2000 using the key door sensor to detect blockage. At 2010, a close command is received at a wireless lockbox over a wireless data interface from a mobile device. At 2020, a microprocessor directs a try of the wireless lockbox to retract or close. At 2030, a sensor detects that an object is impeding the tray from retracting or closing. At 2040, the microprocessor stops the tray from retracting. The microprocessor may accomplish this by stopping a motor from turning a rotating screw, stopping a linear actuator, stopping a pneumatic actuator, or by other appropriate means depending on the type of deployment mechanism.

Figure 21:
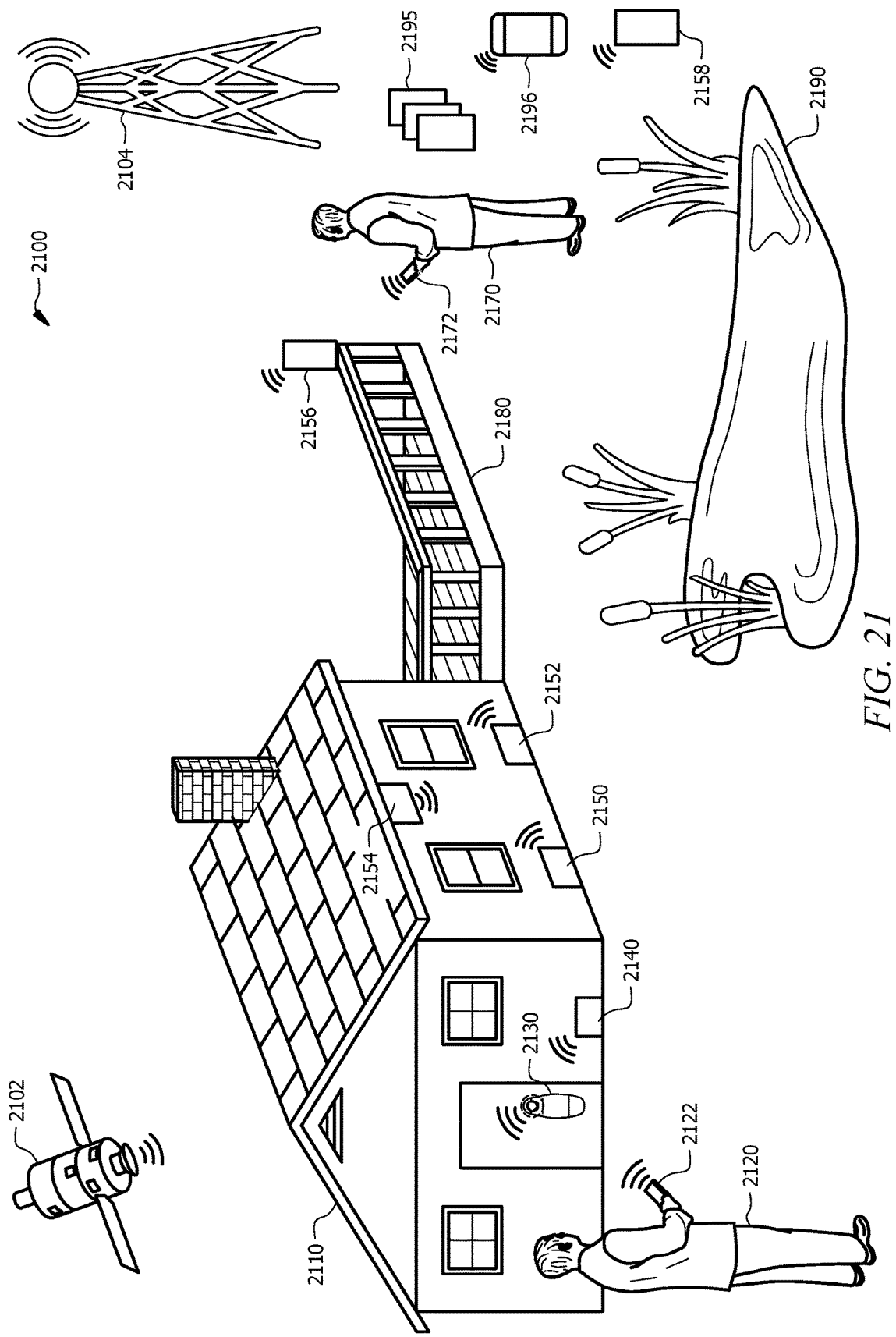
FIG. 21 is a diagram of a system embodiment under the present disclosure.

Further embodiments of the present disclosure can comprise information beacons located throughout a house that is being sold or toured by potential buyers. An embodiment of a system 2100 comprising beacons can be seen in FIG. 21. System 2100 shows a house 2110 with wireless beacons 2150, 2152, 2154, 2156, 2158 placed throughout the property. The beacons can be wirelessly enabled, preferably by Bluetooth, though other wireless standards are possible as well. House 2110 can have a wireless lockbox 2130, a Wi-Fi router 2140, as well as a porch 2180 and yard or pool area 2190. Various types of data networks (by way of example only, satellite 2102 and cell tower 2104) can provide communication options between various elements of FIG. 21. As an agent/buyer 2120, 2170 tours the house, the beacons 2150, 2152, 2154, 2156, 2158 can detect their presence and send information to the agent or buyer's mobile devices 2122, 2172. Alternatively, the beacons can play audio or video recordings about the house, or send such recordings to a user device. For example, a beacon in the kitchen can send a message to a realtor's mobile device advising the realtor that the kitchen was remodeled in 2012, with professional grade appliances. A beacon at the front door can advise a buyer that the house was built in 1986 and has three bedrooms and three baths. A beacon near the back door can provide information regarding the back yard and fence. A beacon 2156 on the back porch can give information about the porch or back yard. A beacon 2158 by the pool can give pool details. An owner or other user can program the beacons for information to share at each location. A single house can contain multiple beacons located at various positions. In some embodiments, the beacons and the wireless lockbox can all communicate with each other, either directly or via a wireless router 2140. Each beacon 2150, 2152, 2154, 2156, 2158 can comprise a microprocessor, a memory, a hard drive, a plurality of wireless interfaces, a power supply and other components. In a Bluetooth embodiment, the beacons can search for nearby devices with Bluetooth, and when nearby, send the device a message containing house information. The beacons can have functionality to communicate with the wireless lockbox or the servers 2195 (or e.g. servers 560 in FIG. 5), to know how to connect to the nearby mobile device(s). Beacons 2150, 2152, 2154, 2156, 2158, wireless lockbox 2130, and other elements of system 2100 can also communicate with remote device 2196, such as an owner/seller/realtor mobile device. Updates or alerts can be sent by Bluetooth, Wi-Fi, cellular, or another means. For example, wireless lockbox 2130 may comprise a cellular interface by which alerts and notifications can be sent to remote device 2196. Alternatively, wireless lockbox may connect by Bluetooth to visitor mobile device 2122, and use its cellular connection to send notifications to remote device 2196.

Beacons 2150, 2152, 2154, 2156, 2158, besides providing information to visitors, can track data regarding house visits. For example, beacons 2150, 2152, 2154, 2156, 2158 can store, or transmit elsewhere (such as to servers 2195) data about, for example, amount of foot traffic to certain parts of the house, length of stay in different parts of the house, size of a visiting group, routes taken on house tours, or other information.

Figure 22:
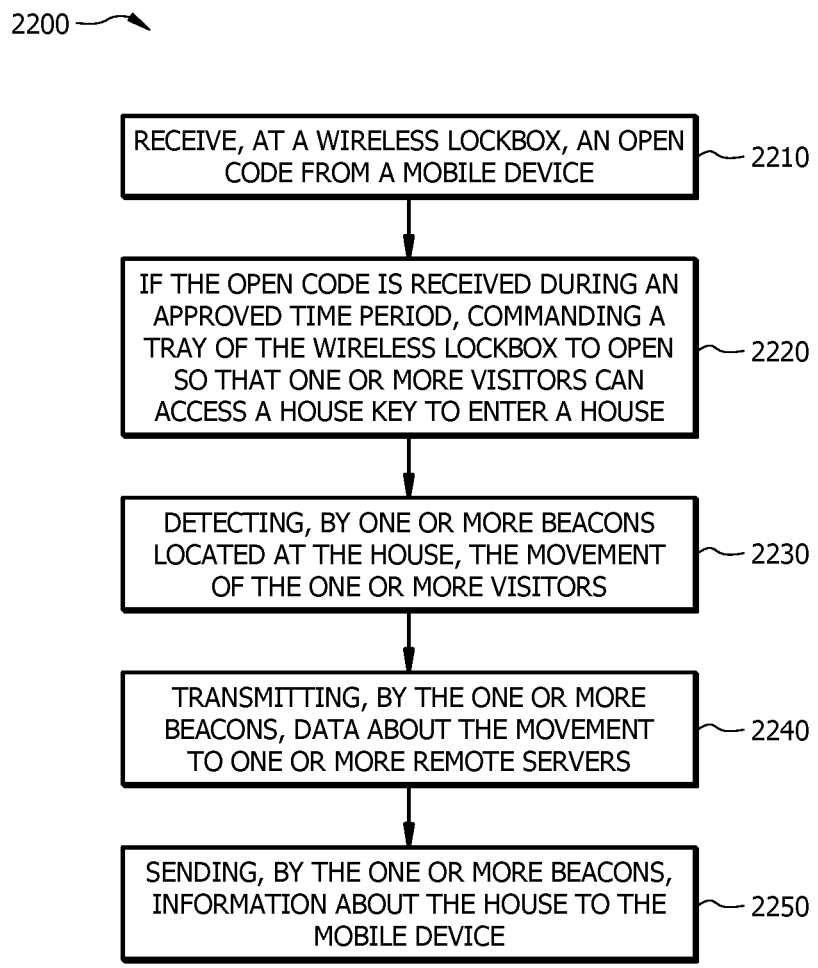
FIG. 22 is a flow-chart diagram of a method embodiment under the present disclosure.

FIG. 22 displays a possible method embodiment 2200 of the use of beacons under the present disclosure. At 2210, an open code is received at a wireless lockbox from a mobile device. At 2220, if the open code is received during an approved time period, a tray is commanded to open so that one or more visitors can access a house key to enter a house. At 2230, one or more beacons in the house detect the movement of the one or more visitors. At 2240, the one or more beacons transmit data about the movement to one or more remote servers. At 2250, the one or more beacons send information about the house to the mobile device.

Figure 23:
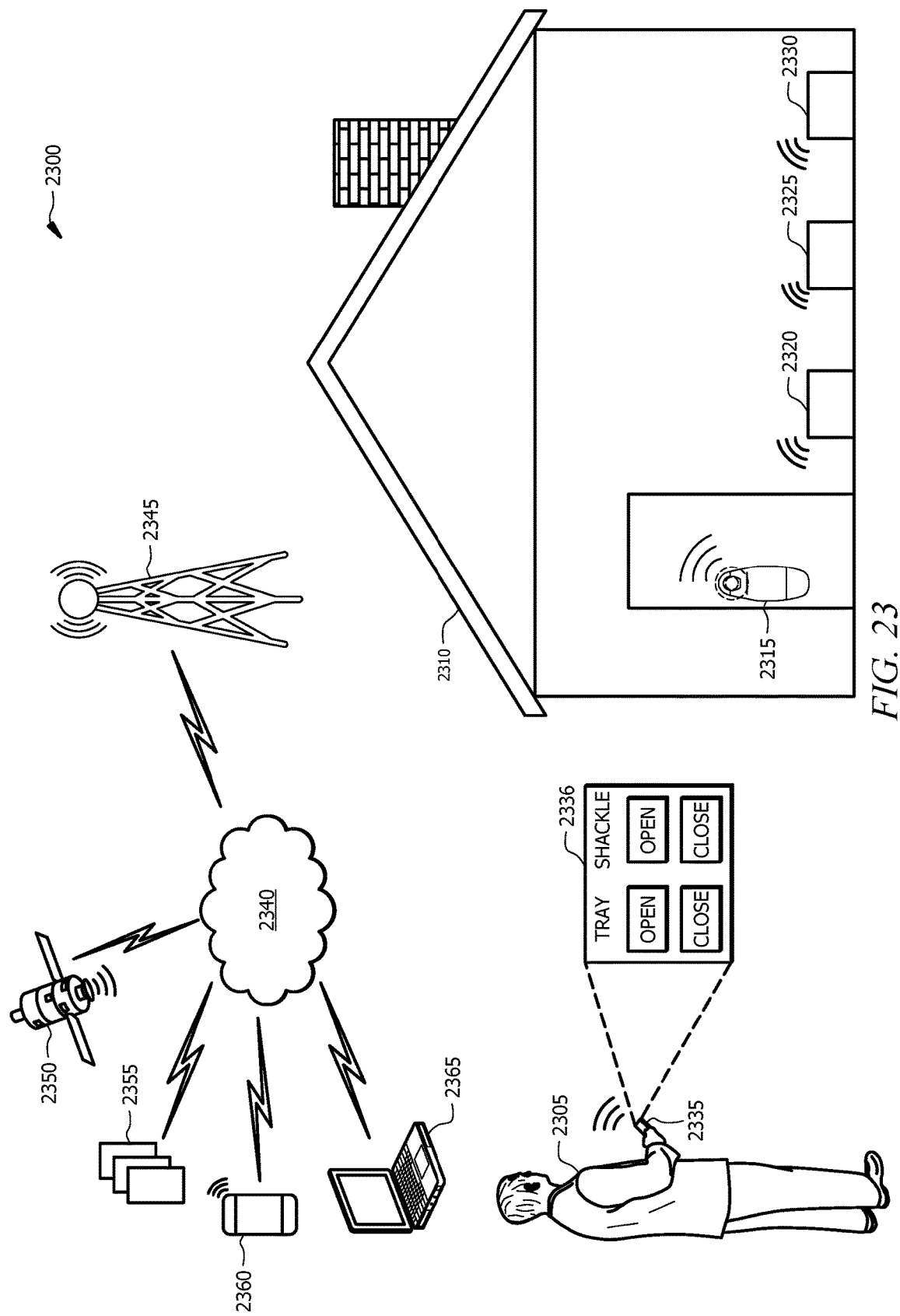
FIG. 23 is a diagram of a system embodiment under the present disclosure.

Connectivity for, and between, various elements of the described systems, can be provided for in various ways. FIG. 23 displays a possible embodiment under the present disclosure with various connectable devices. A user 2305 can approach the house and his device 2335 may be able to connect to wireless lockbox 2315 via Bluetooth. If the user is a buyer or a buyer's realtor, he can open the proper mobile application on device 2335. If the current time is during an approved visit time slot, then the user can be presented with an interface such as 2336 for opening and closing the lockbox 2315. If the time is outside the approved time slot, then the user will preferably not even be presented with the option of opening, closing, or otherwise commanding lockbox 2315. If user 2305 is the owner, seller, or other approved person, then they may also get the option of opening or closing the shackle on the wireless lockbox 2315. Other connectable devices include optional beacons 2320, wireless hubs 2325, and Wi-Fi routers 2330. The various elements of system 2300 may connect over satellite 2350, cellular 2345, hardline, or other means to network 2340, such as the internet. Communication can be accomplished with remote servers 2355, remote mobile device 2360 (such as an owner or selling realtor), or a remote computer 2365 (such as the computer of an owner, seller or their realtor). Each device can comprise a variety of communications means, such as Bluetooth, cellular, satellite, Wi-Fi, hardline, or other.

In some embodiments of system 2300, a wireless lockbox 2315 can comprise a Bluetooth interface (but not Wi-Fi or cellular) by which it connects to a visitor's mobile device 2335, such as a smartphone. A buyer 2305 can approach the house 2310 and power on the wireless lockbox 2315, and open the proper mobile application. The lockbox 2315 and the device 2335 can pair to each other via Bluetooth. The lockbox 2315, while paired to device 2335, can transmit data over the cellular connection of device 2335. Lockbox 2315 can then communicate with servers 2355 that can store visit data, or with a remote mobile device 2360 or computer 2365, to determine a list or identify of approved visitors. It can then determine if user 2305 is an approved visitor. Lockbox can receive either an application or device identification number related to mobile device 2335, or a username that is associated with mobile device 2335, in order to compare an approved user/device to the user 2305 and device 2335. Each lockbox 2315 can have an associated identification number. Servers 2355, remote device 2360, or computer 2365 can store approved visits with the associated identifications of lockboxes, users, mobile applications, or mobile devices. Such information can be sent to lockbox 2315 and/or device 2335 so that they can determine if a given device is approved to unlock or open a given wireless lockbox 2315. If user 2305 is not approved at a given time, then the user 2305 will preferably not even receive an open/close interface by the mobile application. When the user is approved, he can press 'open' and the wireless lockbox can deploy a tray or drawer so that user can retrieve a house key and enter home 2310 for a visit. While user 2305 is at home 2310, the Bluetooth connection between device 2335 and wireless lockbox 2315 can be maintained. This can allow wireless lockbox 2315 to send notifications and updates during user 2305's visit. Notifications can include: visitor arrival, lockbox opening, lockbox closing, key removal, key replacement, key being stolen alarm, battery level and more. Some or all of these types of notifications can alternately be sent to the mobile device 2335. In some embodiments, beacons 2320 may comprise a Bluetooth interface (but not cellular or Wi-Fi) and may pair with device 2335 during a user visit. While paired, beacons 2320 may send notifications, data, and other information to any of servers 2355, remote device 2360, and computer 2365.

Some owners/sellers may have a wireless lockbox 2315 with only a Bluetooth interface. After using the lockbox 2315, they may realize they want more connectivity options. In such cases a wireless hub 2325 may be used or added to a preexisting system. Wireless hub 2325 can comprise a Bluetooth interface for connecting to wireless lockbox 2315. Wireless hub 2325 may also comprise Wi-Fi (or another wireless interface) that can connect to a wireless router 2330. In this manner, a wireless lockbox 2315 can have persistent connectivity and won't be dependent on a user device 2335 being nearby. Notifications or alerts, in these embodiments, can be sent by Wi-Fi to any of server 2355, device 2360, and computer 2365.

In other embodiments of system 2300, the wireless lockbox 2315 can also comprise a cellular interface (instead of just a Bluetooth interface). In such embodiments, a user 2305 may still power on the lockbox 2315 when he arrives for a visit. But in such embodiments the lockbox 2315 may not be dependent on the mobile device 2335 cellular connection. Pairing of the lockbox 2315 and the device 2335 via Bluetooth for the purpose of verifying the user visit is preferred. In some embodiments a cellular enabled lockbox 2315 could still use the cellular connection of a device 2335 once paired. Similar to the lockbox, beacons 2320 in some embodiments can comprise cellular interfaces such that Bluetooth pairing with a mobile device 2335 is unnecessary. Lockboxes 2315 and beacons 2320 can also comprise Wi-fi interfaces for connecting to a wireless router 2330. In such situations, a cellular interface can be unnecessary for transmitting information to, for example, servers 2355, device 2360, or computer 2365. In various embodiments, lockboxes 2315, beacons 2320 can comprise any or multiple of Bluetooth, cellular, and Wi-Fi interfaces. Information and alerts can be transmitted to, for example, servers 2355, device 2360, or computer 2365 by any means desired or necessary. Lockboxes 2315 and beacons 2320 can comprise multiple means for transmitting information, and the means chosen can depend on predetermined user chosen settings, network availability, network cost, or other factors. Some beacons 2320 can use Bluetooth pairing, others can use cellular, while others use Wi-Fi, similar to lockboxes 2315.

Embodiments under the present disclosure can also comprise a key with connectivity and security capabilities, such as key 210 of FIG. 2. A further possible embodiment 2400 can be seen in FIG. 24. Key 2450 can fit within wireless lockbox 2420 until removed by a user. Key 2450 can comprise one or more of: a Bluetooth interface 2455, a GPS (global positioning system) interface 2460, an RFID transmitter or tag 2465, power supply 2470, and speaker 2475. Once a key 2450 is removed from a lockbox 2420, there may be a desire to make sure the key 2450 isn't stolen. To protect against this, the key 2450 can be configured to notify an owner, seller, or realtor if it is stolen or taken beyond a chosen perimeter or distance from the lockbox 2420. The lockbox 2420 can detect that the key is within the tray by means of RFID. An RFID tag 2465 can be located on the key 2450 and an RFID transmitter on the lockbox 2420, or vice versa. Once the key 2450 is removed by a user, some embodiments allow for the wireless lockbox 2420 and key 2450 to maintain a Bluetooth connection. Bluetooth allows for two devices to monitor the distance between each other. A user could choose to set a perimeter or maximum radius of, for example, 100 feet. Once key 2450 is moved further than 100 feet from the lockbox 2420, then an alarm can be sent to the owner, seller, or realtor. The alarm or notification can be sent by the lockbox 2420 or by the key 2450. Key 2450 may also have a connection via Bluetooth interface 2455 to a visiting user's mobile device (not shown) and can use the mobile device's cellular or other data connection to transmit a message. In embodiments where the lockbox 2420 lacks connectivity beyond a Bluetooth interface, the key 2450 may have to send an alarm itself. Key 2450 can also use a visitor mobile device's data connection to send updates during a visit, such as time spent at a given location, battery level, or other data. RFID sensors have been described for detecting when the key 2450 is in the lockbox 2420, but other position sensors or means are within the present disclosure. For example, location detection can be used with Bluetooth or NFC.

Other embodiments of system 2400 under the present disclosure can comprise a key 2450 that relies more on GPS 2460 to determine its location. In such embodiments, key 2450 can still maintain a Bluetooth connection to a mobile device or lockbox, but it can determine its location via GPA interface 2460. In such embodiments, an owner/seller/realtor may set a radius, maximum distance from a lockbox, or they may draw a perimeter around a property beyond which a key 2450 should not move. If the key does move outside of a chosen area, then a notification can be sent to the owner/seller/realtor, or to devices such as servers 2355, device 2360, or computer 2365 shown in FIG. 23. An identity of the visitor with the key 2450 can also be sent to any of the possible recipients. Notifications, alarms, and other messages can be sent by either the key 2450 or the wireless lockbox 2420.

Power supply 2470 can comprise a lithium-ion battery, rechargeable battery, solar panel, an induction based power source that draws energy from the movement of a user, or other types of power or combinations of the preceding.

Speaker 2475 can sound an alarm when key 2450 is taken out of a predetermined boundary. The alarm can comprise any type of sound, including an audio message to a user. Speaker 2475 can also be used to transmit any preferred audio message to a user.

Figure 24:
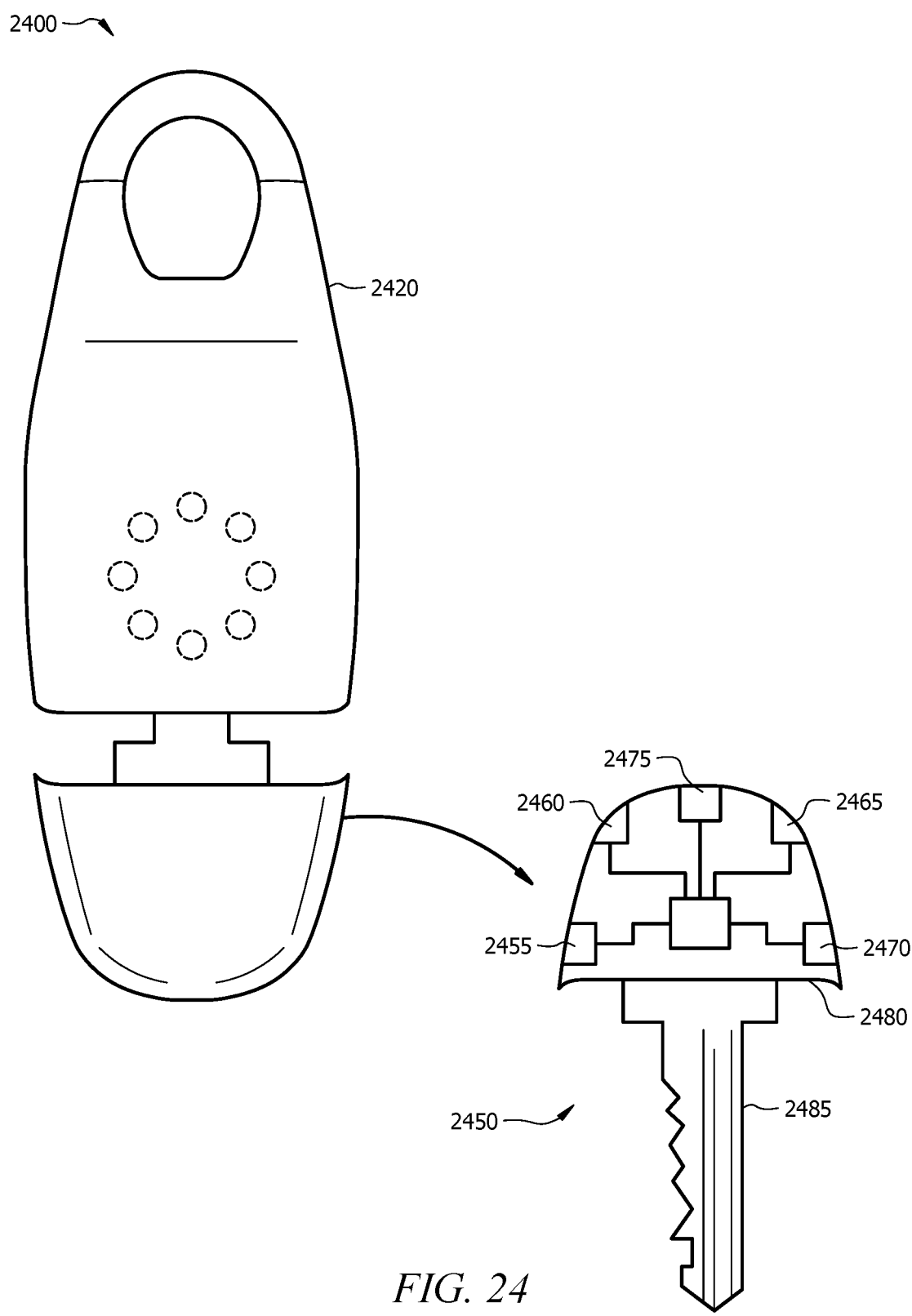
FIG. 24 is a diagram of a system embodiment under the present disclosure.

Key 2450 can comprise a teeth portion 2485 and a head portion 2480. Head portion 2480 may be integrally formed with teeth portion 2485. Alternatively, head portion 2480 may be added onto teeth portion 2485 by means of mechanical attachment, or other means. In some embodiments, the functionality of head portion 2480 can be provided by a small device added to a key chain, for example. FIG. 24 shows a key 2450 with a typical looking teeth portion 2485 with a number of ridges that can open a door. However, key 2450 can comprise a variety of key types. Some keys use a magnet or RFID system to unlock a door instead of a series of teeth or ridges. Some embodiments can comprise a body portion that can comprise any type of coupling mechanism for opening another item, such as a magnet, RFID, infrared, teeth, wireless signals, or combinations of the foregoing.

In other embodiments under the present disclosure, key 2450 can comprise a cellular or Wi-Fi interface, or other data interface, for communicating with other devices described in the present disclosure, such as for example, such as servers 2355, device 2360, or computer 2365 of FIG. 23.

Figure 25:
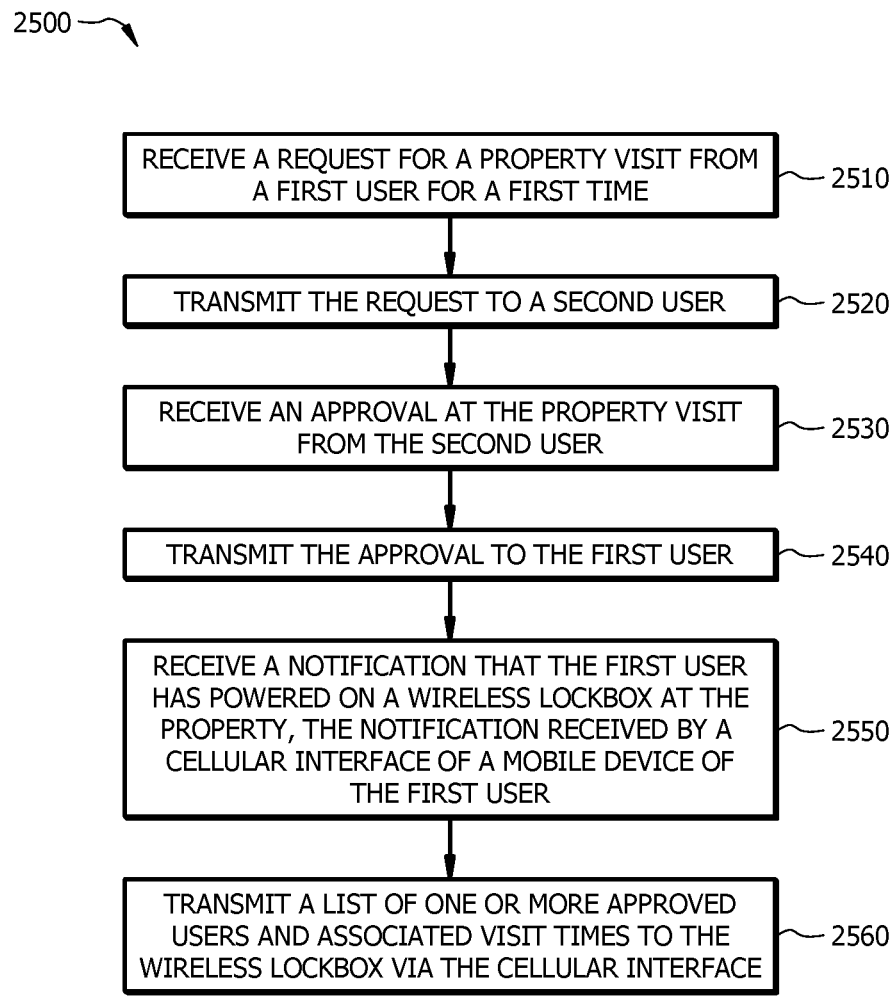
FIG. 25 is a flow-chart diagram of a method embodiment under the present disclosure.
Figure 26:
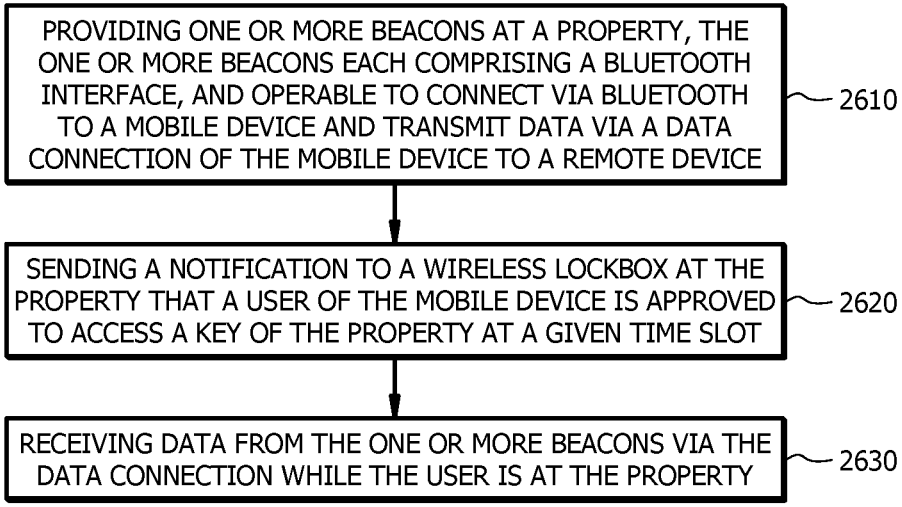
FIG. 26 is a flow-chart diagram of a method embodiment under the present disclosure.
Figure 27:
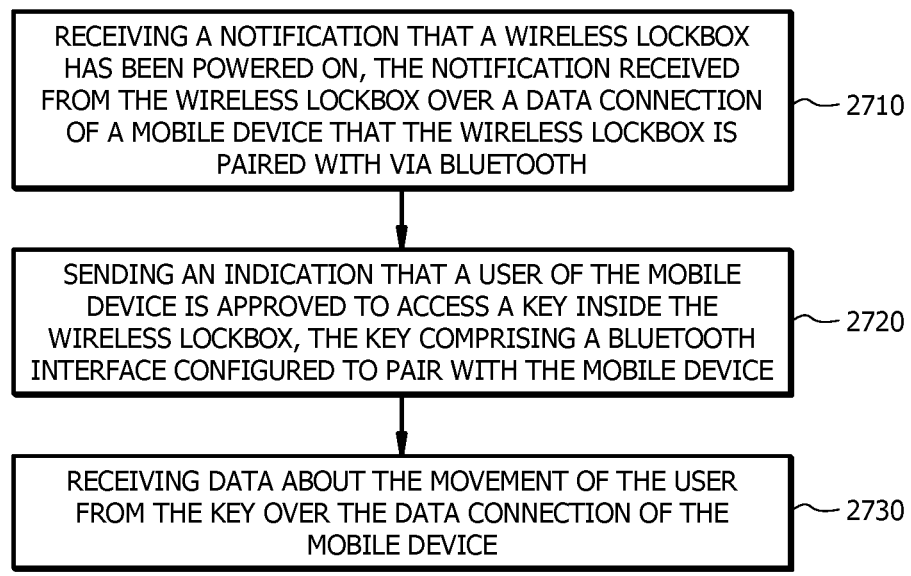
FIG. 27 is a flow-chart diagram of a method embodiment under the present disclosure.

FIGS. 25-27 display possible method embodiments under the present disclosure.

FIG. 25 displays a possible method embodiment 2500 for how a wireless lockbox powers on and determines whether a user is approved to visit a house. At 2510, a request is received for a property visit from a first user for a first time. At 2520, the request is transmitted to a second user. At 2530, an approval is received for the property visit from the second user. At 2540, the approval is transmitted to the first user. At 2550, a notification is received that the first user has powered on a wireless lockbox at the property, the notification is received from the wireless lockbox via a cellular interface of a mobile device of the first user. At 2560, a list of one or more approved user and associated visit times is transmitted to the wireless lockbox via the cellular interface. In preferred embodiments, the wireless lockbox can be able to communicate via the cellular interface because it is Bluetooth paired to the mobile device.

FIG. 26 displays a possible method embodiment 2600 for operating beacons under the present disclosure. At 2610, one or more beacons is provided at a property. The one or more beacons each comprise a Bluetooth interface, and are operable to connect via Bluetooth to a mobile device and transmit data via a data connection (such as cellular) of the mobile device to a remote server or device. At 2620, a notification is sent to the wireless lockbox at the property that a user of the mobile device is approved to access a key of the property at a given time slot. At 2630, data is received from the one or more beacons via the data connection while the user is at the property, such as data about the user's movements and actions at the property.

FIG. 27 displays a possible method embodiment 2700 for operating a smart key for use with a wireless lockbox. At 2710, a notification is received that a wireless lockbox has been powered on, the notification received from the wireless lockbox over a data connection of a mobile device that the wireless lockbox is paired with via Bluetooth (other pairing means are possible). At 2720, an indication is sent to the wireless lockbox that a user of the mobile device is approved to access a key inside the wireless lockbox, the key comprising a Bluetooth interface configured to pair with the mobile device (other pairing means are possible) and the key configured to collect data about the actions of the user. A 2730, data is received from the key about the movement of the user over the data connection of the mobile device.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A wireless lockbox system for storing a key at a property, comprising:
 a wireless lockbox, the wireless lockbox comprising a first Bluetooth interface, a tray, a microprocessor operable to deploy and retract the tray by controlling a motor, and a power supply, the wireless lockbox configured to pair with a mobile device via the first Bluetooth interface and to communicate with a remote device via a data interface of the mobile device, the wireless lockbox further configured to receive information from the remote device for determining if the mobile device is allowed to command the microprocessor to deploy and retract the tray; and
 a key configured to fit within the tray and comprising a second Bluetooth interface, the key configured to pair with the mobile device via the second Bluetooth interface and to collect data about they key's movement, the key further configured to transmit the data to the remote device via the data interface.

2. The system of claim 1 wherein the key further comprises a GPS (global positioning system) sensor.

3. The system of claim 1 wherein the data interface comprises a cellular interface.

4. The system of claim 1 wherein the motor is configured to turn a rotating screw in one direction to deploy the tray and in another direction to retract the tray.

5. The system of claim 1 wherein the wireless lockbox is configured to receive a communication over the first Bluetooth interface from the mobile device to deploy the tray.

6. The system of claim 1 wherein the microprocessor is operable to independently deploy and retract the tray without user interaction.

7. The system of claim 1 wherein the key is configured to detect its distance from the wireless lockbox via the second Bluetooth interface.

8. The system of claim 1 wherein the key is operable to send a notification to the remote device via the data interface of the mobile device if the key moves outside a predetermined boundary.

9. A smart key, comprising:
a body portion configured to unlock a door;
a power supply;
a microprocessor; and
a Bluetooth interface configured to couple with a wireless lockbox and with a mobile device;
wherein the smart key is configured to collect data about its location and to transmit the data to one or more remote devices over the Bluetooth interface.

10. The smart key of claim 9 further comprising an RFID tag configured to allow the wireless lockbox to detect if the smart key is located in a tray of the wireless lockbox.

11. The smart key of claim 9 wherein the smart key is configured to transmit the data to the one or more remote servers via a data interface of the mobile device.

12. The smart key of claim 9 further comprising a GPS sensor and wherein the smart key uses the GPS sensor to collect data about its location.

13. The smart key of claim 9 wherein the smart key uses the Bluetooth interface to detect its distance from the wireless lockbox.

14. The smart key of claim 9 further configured to send a notification to the one or more remote devices if it moves outside a predetermined boundary.

15. The smart key of claim 14 wherein the predetermined boundary comprises a maximum distance from the wireless lockbox.

16. The smart key of claim 9 wherein the body portion comprises at least one of: a plurality of ridges, a magnet, or a wireless transmitter.

17. A method of detecting the location of a house key, comprising:
receiving a notification that a wireless lockbox has been powered on, wherein the notification is received from the wireless lockbox via a data connection of a mobile device that the wireless lockbox is paired with via Bluetooth;
sending an indication to the wireless lockbox that a user of the mobile device is approved to access a key inside the wireless lockbox, the key comprising a Bluetooth interface configured to pair with the mobile device and to send information via the data connection and the key configured to collect data about its location;
receiving data from the key about the location of the key via the data connection of the mobile device.

18. The method of claim 17 further comprising receiving a notification from the key via the data connection if the key detects that it is outside a predetermined boundary.

19. The method of claim 17 wherein the key is operable to collect data about its location by means of a GPS sensor.

20. The method of claim 17 wherein the key is operable to collect data about its location by means of detecting its distance from the wireless lockbox via the Bluetooth interface.

* * * * *